United States Patent
Strater, Jr. et al.

(10) Patent No.: US 10,643,116 B1
(45) Date of Patent: May 5, 2020

(54) SYSTEM AND METHOD FOR CONTACTLESS ENCODING AND PRINTING OF A TRIPLE INTERFACE SMART CARD THROUGH NEAR-FIELD NETWORK

(71) Applicants: William H. Strater, Jr., Vero Beach, FL (US); Markus Portmann, Vero Beach, FL (US)

(72) Inventors: William H. Strater, Jr., Vero Beach, FL (US); Markus Portmann, Vero Beach, FL (US)

(73) Assignee: GRAPH-TECH-USA, LLC, Fort Pierce, FL (US)

( * ) Notice: Subject to any disclaimer, the term of this patent is extended or adjusted under 35 U.S.C. 154(b) by 0 days.

(21) Appl. No.: 16/192,829

(22) Filed: Nov. 16, 2018

(51) Int. Cl.
*G06K 19/06* (2006.01)
*G06K 19/07* (2006.01)

(52) U.S. Cl.
CPC ... *G06K 19/0723* (2013.01); *G06K 19/06187* (2013.01)

(58) Field of Classification Search
CPC ............. G06K 19/06046; G06K 19/07; G07G 1/0045; G07G 1/0081
USPC ...... 235/492, 383, 487, 380, 462.46, 472.02
See application file for complete search history.

(56) References Cited

U.S. PATENT DOCUMENTS

| | | | |
|---|---|---|---|
| 6,161,762 A | 12/2000 | Bashan et al. | |
| 6,394,346 B1 * | 5/2002 | Bonneau, Jr. | G01N 3/20 235/380 |
| 6,688,519 B2 * | 2/2004 | Vuong | B41J 2/325 235/380 |
| 7,164,353 B2 * | 1/2007 | Puleston | G06K 7/0008 324/210 |
| 7,181,665 B2 | 2/2007 | Son | |
| 7,210,583 B2 * | 5/2007 | Walpus | B43M 3/04 209/552 |
| 8,453,939 B2 | 6/2013 | Lee | |
| 8,544,733 B2 * | 10/2013 | Finkenzeller | G06K 19/07716 235/380 |

(Continued)

FOREIGN PATENT DOCUMENTS

| | | |
|---|---|---|
| WO | 2001027587 A1 | 4/2001 |
| WO | 2010108463 A1 | 9/2010 |
| WO | 2014160990 A2 | 10/2014 |

*Primary Examiner* — Daniel St Cyr
(74) *Attorney, Agent, or Firm* — LegalForce RAPC Worldwide

(57) ABSTRACT

Disclosed are a method, a system and/or a device for contactless encoding and printing of a triple interface smart card through a near-field network. In one embodiment, a triple interface encoding device includes a production controller communicatively coupled to an object encoding array, an object conveyor transport, and an object encoding server. The production controller may detect a sequence of target objects and associates it with one of a plurality of user accounts. The object encoding server configures the object encoding array to contactlessly encode the target object. Further, the object encoding server configures target object feeder to automatically deploy a number of target objects equal to a number of contactless encoders of the object encoding array onto the conveyor belt of the object conveyor transport spaced at corresponding repeat positions as the number of contactless encoders. Furthermore, object encoding server configures the conveyor belt to position the target objects.

20 Claims, 9 Drawing Sheets

(56) References Cited

U.S. PATENT DOCUMENTS

| | | |
|---|---|---|
| 8,763,912 B1 | 7/2014 | Vogt |
| 9,696,716 B2 * | 7/2017 | Pasquariello .......... G06Q 10/00 |
| 9,710,745 B1 * | 7/2017 | O'Shea ............ G06K 19/07718 |
| 2005/0045720 A1 | 3/2005 | Fruhauf |
| 2006/0086806 A1 | 4/2006 | Conraux et al. |
| 2009/0255996 A1 | 10/2009 | Brown et al. |

* cited by examiner

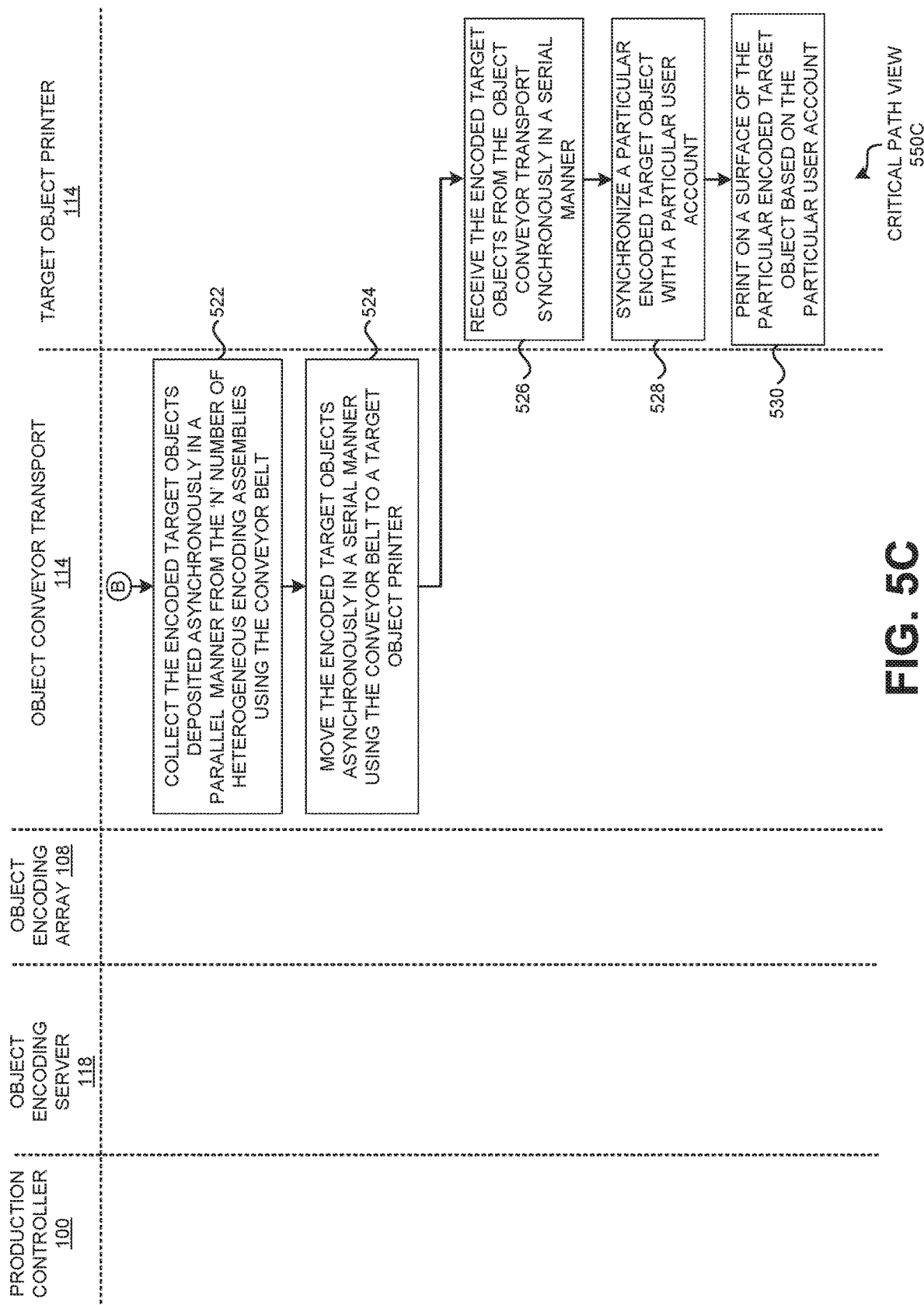

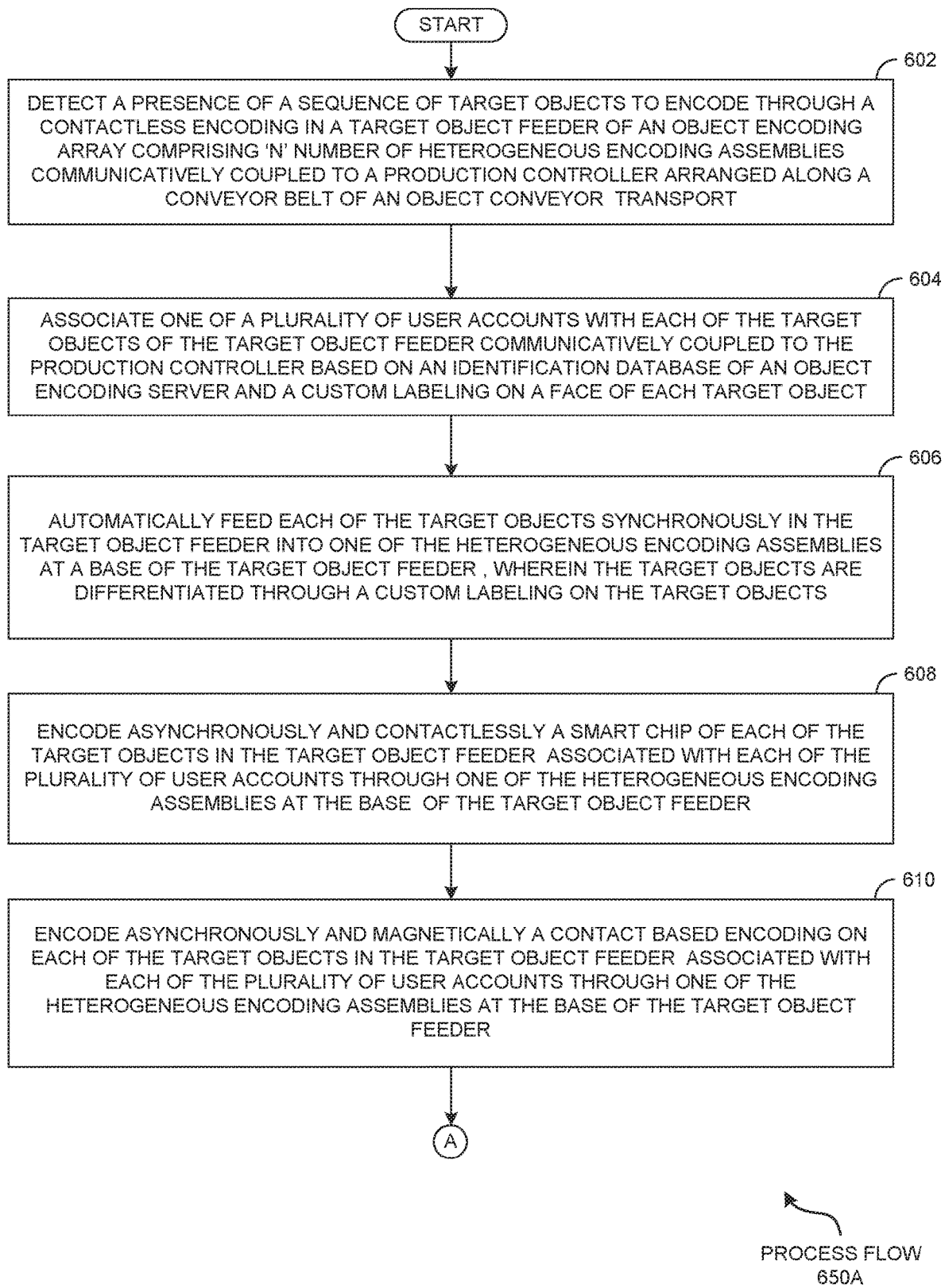

SYSTEM AND METHOD FOR CONTACTLESS ENCODING AND PRINTING OF A TRIPLE INTERFACE SMART CARD THROUGH NEAR-FIELD NETWORK

FIELD OF TECHNOLOGY

This disclosure relates generally to printing and encoding apparatus and, more particularly, to a method, a device and/or a system of encoding and printing of a triple interface smart card through a near-field network.

BACKGROUND

A smart card, chip-card, and/or integrated circuit card (ICC) may include an embedded integrated circuit (IC) chip that may be used in many worldwide applications. The various implementation of smart card may include a secured identity application, a healthcare application, a secured transaction application, and/or a telecommunications application, etc.

The smart card may use a triple interface chip with contact and contactless based read-write interfaces. Processing the smart card may require encoding the chip of the smart card using a chip encoder, encoding the magnetic stripe of the smart card using a magnetic encoder, and/or printing via an inkjet printer on the surfaces of the smart card.

The processing time for the triple interface chip may be limited to 9600 baud rate by the contact-based writing. Further, the contact-based writing may require an increased processing time due to an expanding data size that needs to be encoded on the triple interface chip. When processing a large volume of smart cards with triple interface chip using a contact-based writing, the processing time may aggravate due to slower contact-based writing speed (e.g., 9600 baud rate), and under-utilization of the high-speed inkjet printer, making the system inefficient and expensive.

Additionally, the method of a contact-based encoding device may use moving (e.g., rotating) mechanical components of the contact-based encoding device to automatically encode the chip. The moving mechanical components of the contact-based encoding device may produce residue, thermal stress, and misalignment of its component parts when operating, making them unreliable. Further, the moving mechanical components of the contact-based encoding device may wear out because of vibration, shock, and/or fluid ingress, etc. Hence, it will be advantageous to use a method that may eliminate the use of contact-based writing and/or moving (e.g., rotating) mechanical components for efficient processing of the triple interface cards.

SUMMARY

Disclosed are a method, a system and device for contactless encoding and printing of a triple interface smart card through a near-field network.

In one aspect, a triple interface encoding device includes a production controller with a processor and a memory communicatively coupled with the processor to detect a presence of a sequence of target objects to be tri-encoded through a contactless encoding in a target object feeder of an object encoding array. The object encoding array includes a 'n' number of contactless encoders arranged along a conveyor belt of an object conveyor transport. The production controller associates one of a plurality of user accounts with each of the target objects of the target object feeder based on an identification database of an object encoding server communicatively coupled to the production controller.

The object encoding server configures data to be sent to the object encoding array to contactlessly encode the data onto a smart chip of the target objects associated with each of the plurality of user accounts through one of the contactless encoder. In addition, the object encoding server configures the target object feeder to automatically deploy a number of target objects equal to the number of contactless encoders onto the conveyor belt of the object conveyor transport spaced at corresponding repeat positions as the number of contactless encoders. Additionally, the object encoding server configures the conveyor belt of the object conveyor transport to position the target object underneath the number of contactless encoders to encode the configured data onto the target object.

The object encoding array further includes the 'n' number of heterogeneous encoding assemblies communicatively coupled to the production controller. The object encoding array automatically authenticates and position each of the contactlessly encoded target objects synchronously underneath one of the heterogeneous encoding assemblies at a base of the target object feeder. The target objects are differentiated through a custom labeling on the target objects.

The object encoding array asynchronously encodes a contact based encoding on each of the contactlessly encoded target objects in the target object feeder associated with each of the plurality of user accounts through one of the heterogeneous encoding assemblies at the base of the target object feeder, Further, the object encoding array magnetically encodes the contact based encoding of each of the contactlessly encoded target objects in the target object feeder associated with each of the plurality of user accounts through one of the heterogeneous encoding assemblies at the base of the target object feeder. The object encoding array identifies and rejects a first non-conforming target object. The object encoding array deposits asynchronously the encoded target objects in parallel onto the conveyor belt of the object conveyor transport. The object conveyor transport communicatively coupled with the production controller collects the encoded target objects deposited asynchronously in a parallel manner from the 'n' number of heterogeneous encoding assemblies using the conveyor belt. The object conveyor transport moves the encoded target objects asynchronously in a serial manner using the conveyor belt to a target object printer. The object conveyor transport identifies and rejects a second non-conforming target object.

Yet further, the target object printer is communicatively coupled to the production controller to receive the encoded target objects from the object conveyor transport synchronously in a serial manner. The target object printer synchronizes a particular encoded target object with a particular user account. The target object printer prints on a surface of the particular encoded target object based on the particular user account. The target object printer identifies and rejects a third non-conforming target object.

The contactless encoding may be a radio-frequency identification (RFID) enabled encoding and/or a Near-Field Communications (NFC) enabled encoding. The contact based encoding may be a magnetic stripe based encoding. A UV DOD print process may be used to print variable data needed on each target object. The triple interface encoding device may hold target object under the contactless encoder until encoded via the contactless encoding. The contactless encoder may be a Near-Field Communications (NFC) enabled encoder and/or a Radio Frequency Identification (RFID) encoder.

The RFID encoder may first read an identifier to make synchronization, encode the magnetic stripe, and/or print based on the UV DOD print process using an inkjet printer on the front of each target object. The RFID encoder may print a security code with a laser on the back each target object. The contactless encoding may be at read and/or write rates of approximately between 212-848 kilobauds. The object encoding server may configure the 'n' number of heterogeneous encoding assemblies to write an object identifying portion of the encoding via contact based encoding. Further, the object encoding server may configure the RFID encoder to write the object authentication encoding portion contactlessly to optimize the speed of encoding process.

The overall writing time for the target object may be reduced in approximately one-half through automatic feeding of each of the target objects synchronously in the target object feeder and/or asynchronous encoding of the smart chip of each of the target objects.

The target object may be a credit card, a loyalty card, a wrist wrap, a give-away, and/or an entry permit. The triple interface encoding device may encode the smart chip of each of the target object with an RFID encoding, a contact-based encoding, and/or a magnetic stripe encoding. Further, the triple interface encoding device may partially encode the smart chip of each of the target object via the contact-based encoding using the 'n' number of heterogeneous encoding assemblies and/or the contactless encoding using the RFID encoder to optimize the speed of encoding process. The production controller may follow accurately the target objects by means of photocells and/or shaft encoders along a production line. The production controller may analyze and/or send data to and from sub-systems including any one of feeders, antennas, magnetic encoding, inkjets, cameras, and/or machine.

The 'n' number of contactless encoders and/or heterogeneous encoding assemblies may be utilized to process several target objects in parallel to increase a speed of writing to a maximum throughput potential of the contact based encoding. The triple interface encoding device may transfer the encoded target objects to a single inkjet printer.

The 'n' number of heterogeneous encoding assemblies may match the RFID encoder at a repeat distance of each of the target objects. The target object feeder may be fed a number of target objects equal to the number of contactless encoders which are spaced at a same repeat positions as the 'n' number of contactless encoders. A number of contactlessly encoded target objects equal to the number of heterogeneous encoding assemblies are positioned at a base of each heterogeneous encoding assembly spaced at a same repeat positions as the 'n' number of heterogeneous encoding assemblies The triple interface encoding device may index a conveyor belt so the target objects stop underneath the heterogeneous encoding assembly before each target object is encoded. The triple interface encoding device may write to the smart chip via a particular heterogeneous encoding assembly. When the object encoding server receives a confirmation back that all of the writing is finished, then the triple interface encoding device may index into the next group.

The triple interface encoding device may be oriented into a triple terminal configuration to test each target object after encoding to ensure functionality of each encoding through a fast check process in which a partial write is done to check a unique identifier.

In another aspect, a method of a triple interface encoding apparatus includes detecting a presence of a sequence of target objects to tri-encode through a contactless encoding in a target object feeder of an object encoding array. The object encoding array includes 'n' number of heterogeneous encoding assemblies communicatively coupled to a production controller arranged along a conveyor belt of an object conveyor transport. The method includes associating one of a plurality of user accounts with each of the target objects of the target object feeder communicatively coupled to the production controller based on an identification database of an object encoding server and/or a custom labeling on a face of each target object.

The object encoding server configures data to be sent to the object encoding array to contactlessly encode the data onto the target objects associated with each of the plurality of user accounts through one of the heterogeneous encoding assemblies. The object encoding server configures the target object feeder to automatically deploy a number of target objects equal to the number of heterogeneous encoding assemblies onto the conveyor belt of the object conveyor transport spaced at corresponding repeat positions as the number of heterogeneous encoding assemblies. The object encoding server configures the conveyor belt of the object conveyor transport to position the target object underneath the number of heterogeneous encoding assemblies to encode the configured data onto the target object.

The method further includes automatically feeding each of the target objects synchronously in the target object feeder into one of the heterogeneous encoding assemblies at a base of the target object feeder. The target objects are differentiated through the custom labelling on the target objects.

The method includes encoding asynchronously and/or contactlessly a smart chip of each of the target objects in the target object feeder associated with each of the plurality of user accounts through one of the heterogeneous encoding assemblies.

In addition, the method includes encoding asynchronously and/or magnetically a contact based encoding on each of the target objects associated with each of the plurality of user accounts through one of the heterogeneous encoding assemblies.

Further, the method includes depositing asynchronously the encoded target objects in parallel onto the conveyor belt of the object conveyor transport communicatively coupled with the production controller and collecting the encoded target objects. Furthermore, the method includes moving the encoded target objects asynchronously in a serial manner using the conveyor belt to a target object printer communicatively coupled to the production controller and receiving the encoded target objects.

Furthermore, the method includes synchronizing a particular encoded target object with a particular user account and/or printing on a surface of the particular encoded target object based on the particular user account.

The method of triple interface encoding apparatus may further include encoding each of the target objects contactlessly using a radio-frequency identification (RFID) enabled encoding and/or a Near-Field Communications (NFC) enabled encoding. The object encoding server may position a dual terminal to verify a unique individual identifier of the smart chip via contact to ensure it is functional and accurate. The method may further include advancing the confirmed target objects to a Radio Frequency Identification (RFID)

encoder to encode contactlessly. The method may include encoding each of the target objects using the heterogeneous encoding assemblies with a contact based magnetic stripe encoding and printing a variable data needed on each target object using a UV DOD print process.

The method may include holding the target object under the heterogeneous encoding assembly until encoded via the contactless encoding by reading an identifier to make synchronization, encoding the magnetic stripe, printing based on the UV DOD print process using an inkjet printer on a front of each target object, and/or printing a security code with a laser on a back of each target object. The heterogeneous encoding assembly may be a Radio Frequency Identification (RFID) encoder.

The method may include matching the RFID encoder at a repeat distance of each of the target objects and feeding a number of target objects equal to the number of heterogeneous encoding assemblies which are spaced at a same repeat positions as the 'n' number of heterogeneous encoding assemblies. The target object may be a credit card, a loyalty card, a wrist wrap, a give-away, and/or an entry permit. Further, the method may include indexing a belt so the target objects stop underneath the heterogeneous encoding assembly before each target object is encoded and writing to the smart chip via a particular heterogeneous encoding assembly. The smart chip may include an RFID encoding, a contact-based encoding, and/or a magnetic stripe encoding. Additionally, the method may include receiving a confirmation back that all of the writing is finished, followed by indexing the next group in the triple interface encoding device.

In yet another aspect, a triple interface encoding system includes a production controller with a processor and a memory communicatively coupled with the processor to detect a presence of a sequence of target objects to be tri-encoded through a contactless encoding in a target object feeder of an object encoding array. The system includes 'n' number of heterogeneous contactless encoding assemblies communicatively coupled with the production controller arranged along a conveyor belt of an object conveyor transport.

The system associates one of a plurality of user accounts with each of the target objects of the target object feeder based on an identification database of an object encoding server communicatively coupled with the production controller and/or a custom labeling on a face of each target object.

The system configures data in the identification database of the object encoding server to be sent to the object encoding array to encode the data onto the target objects associated with each of the plurality of user accounts through one of the heterogeneous contactless encoding assemblies. In addition, the system configures the target object feeder to automatically deploy a number target objects equal to the number of heterogeneous contactless encoding assemblies onto the conveyor belt of the object conveyor transport spaced at corresponding repeat positions as the number of heterogeneous contactless encoding assemblies.

The system automatically feeds each of the target objects synchronously in the target object feeder into one of the heterogeneous contactless encoding assemblies at a base of the target object feeder. The target objects are differentiated through the custom labeling on the target objects.

The system encodes asynchronously and/or contactlessly a smart chip of each of the target objects in the target object feeder associated with each of the plurality of user accounts contactlessly through one of the heterogeneous contactless encoding assemblies.

The system encodes asynchronously and/or magnetically a contact based encoding on each of the target objects in the target object feeder associated with each of the plurality of user accounts through one of the heterogeneous contactless encoding assemblies.

The system deposits asynchronously the encoded target objects in parallel onto the conveyor belt of the object conveyor transport communicatively coupled with the production controller. Additionally, the system collects the encoded target objects deposited asynchronously in a parallel manner from the 'n' number of heterogeneous contactless encoding assemblies using the conveyor belt. The system moves the encoded target objects asynchronously in a serial manner using the conveyor belt to a target object printer communicatively coupled to the production controller.

Further, the system receives the encoded target objects from the object conveyor transport asynchronously in a serial manner. Even further, the system synchronizes a particular encoded target object with a particular user account and prints on a surface of the particular encoded target object based on the particular user account.

The production controller of the system may follow accurately the target objects by means of photocells and/or shaft encoders along a production line.

The system may utilize 'n' number of heterogeneous contactless encoding assemblies to process several target objects in parallel to increase a speed of writing to a maximum throughput potential of the contact based encoding. The triple interface encoding device may transfer the encoded target objects to a single inkjet printer. The system may encode the smart chip to include an RFID encoding, a contact-based encoding, and/or a magnetic stripe encoding. The system may configure the object encoding server to position a dual terminal to verify a unique individual identifier of the smart chip via contact to ensure it is functional and accurate, and advance the confirmed target objects to a Radio Frequency Identification (RFID) encoder to encode contactlessly. The system may further configure the number of heterogeneous contactless encoding assemblies of the object encoding array to partially encode through a contact-based encoding and/or the RFID encoding to optimize the speed of encoding process.

The system may analyze and/or send data to and/or from sub-systems including any one of feeders, antennas, magnetic encoding, inkjets, cameras, and/or machine.

The system may further include the production controller to use a UV DOD print process to print variable data needed on each target object. The system may first read an identifier to make synchronization, encode the magnetic stripe, and/or print based on the UV DOD print process using an inkjet printer on a front of each target object. The system may print a security code with a laser on each target object. In addition, the system may reduce the overall writing time for the target object to approximately one-half through automatic feeding of each of the target objects synchronously in the target object feeder and/or asynchronous encoding of the smart chip of each of the target objects.

The methods and systems disclosed herein may be implemented in any means for achieving various aspects, and may be executed in a form of a non-transitory machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which:

FIG. 5C is a continuation of critical path view of FIG. 4B, according to one embodiment.

FIG. 6A is a process flow detailing the operations involved in encoding and printing of a plurality of target objects through a contactless encoding using a near-field communication of a triple interface encoding device of FIG. 1, according to one or more embodiments.

Figure 1:
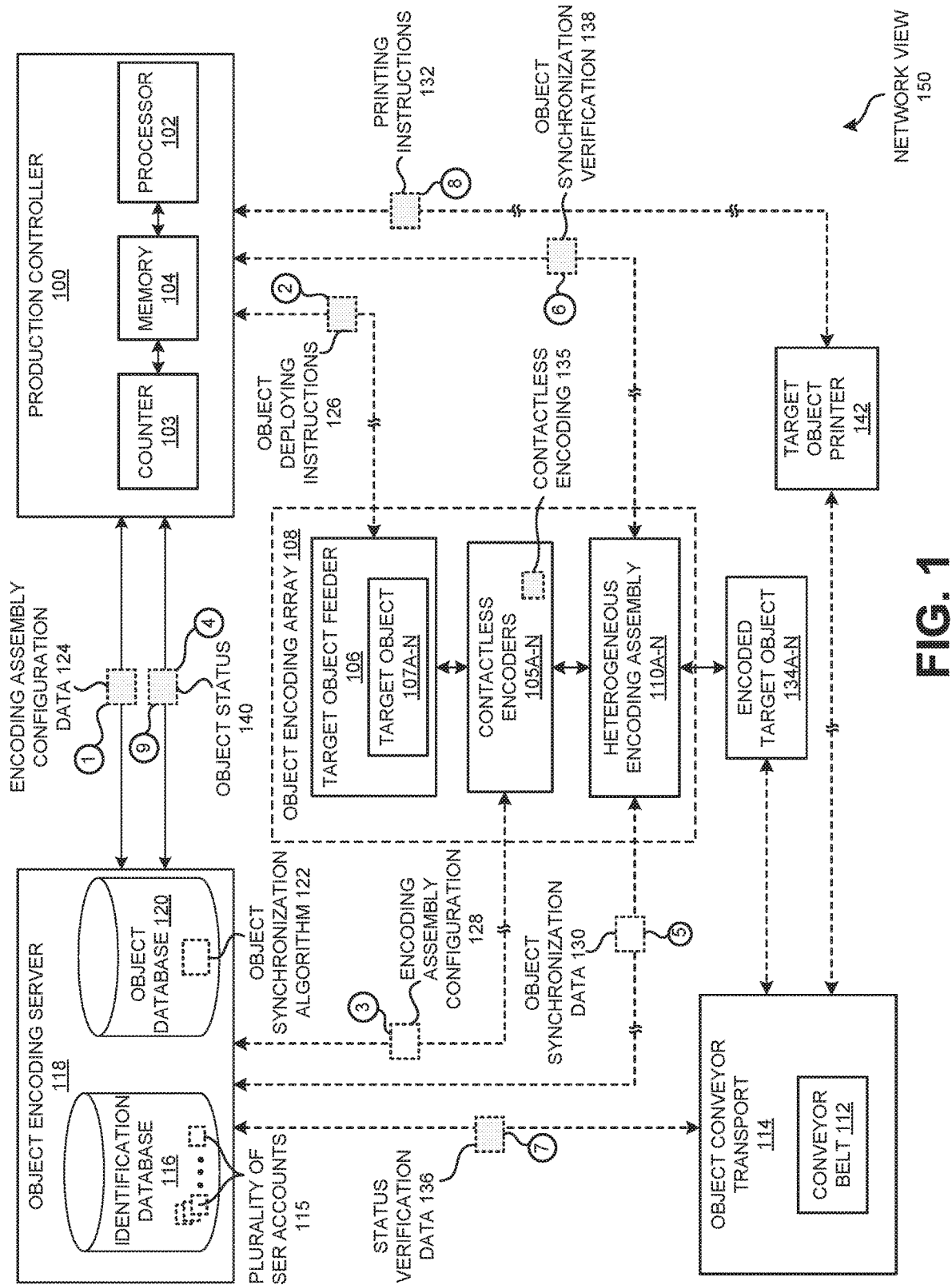
FIG. 1 is a network view illustrating the encoding and printing of a plurality of target objects through a contactless encoding using a near-field communication network of a triple interface encoding device, according to one or more embodiments.

Other features of the present embodiments will be apparent from the accompanying drawings and from the detailed description that follows.

DETAILED DESCRIPTION

Disclosed are a method, a system and device for contactless encoding and printing of a triple interface smart card through a near-field network.

In one embodiment, a triple interface encoding device includes a production controller 100 with a processor 102 and a memory 104 communicatively coupled with the processor 102 to detect a presence of a sequence of target objects 107A-N to be tri-encoded through a contactless encoding 135 in a target object feeder 106 of an object encoding array 108. The object encoding array 108 includes 'n' number of contactless encoders 105A-N arranged along a conveyor belt 112 of an object conveyor transport 114. The production controller 100 associates one of a plurality of user accounts 115 with each of the target objects 107A-N of the target object feeder 106 based on an identification database 116 of an object encoding server 118 communicatively coupled to the production controller 100.

The object encoding server 118 configures data (e.g., user data) to be sent to the object encoding array 108 to contactlessly encode the data onto a smart chip 406 of the target objects 107A-N associated with each of the plurality of user accounts 115 through one of the contactless encoder 105. In addition, the object encoding server 118 configures the target object feeder 106 to automatically deploy (e.g., using encoding assembly configuration 128) a number of target objects 107A-N equal to the number of contactless encoders 105A-N onto the conveyor belt 112 of the object conveyor transport 114 spaced at corresponding repeat positions as the number of contactless encoders 105A-N. Additionally, the object encoding server 118 configures the conveyor belt 112 of the object conveyor transport 114 to position (e.g., using object synchronization algorithm 122) the target object 107 underneath the number of contactless encoders 105A-N to encode the configured data onto the target object 107. The production controller 100 verifies each of the contactlessly encoded target objects 134A-N based on the configured user data prior to further processing and rejects the non-conforming contactlessly encoded target objects 134A-N.

The object encoding array 108 further includes the 'n' number of heterogeneous encoding assemblies 110A-N communicatively coupled to the production controller 100. The object encoding array 108 automatically authenticates and positions each of the contactlessly encoded target objects 134A-N synchronously underneath (e.g., using object synchronization algorithm 122 of the object encoding server 118) one of the heterogeneous encoding assembly 110A-N 110A-N at a base of the target object feeder 106. The target objects 107A-N are differentiated through a custom labeling on the target objects 107A-N.

The object encoding array 108 asynchronously encodes a contact based encoding on each of the contactlessly encoded target objects 134A-N in the target object feeder 106 associated with each of the plurality of user accounts 115 through one of the heterogeneous encoding assemblies 110A-N.

Further, the object encoding array 108 magnetically encodes (e.g., using asynchronous magnetic encoding 204) the contact based encoding of each of the contactlessly encoded target objects 134A-N in the target object feeder 106 associated with each of the plurality of user accounts 115 through one of the heterogeneous encoding assemblies 110A-N. The object encoding array 108 identifies and rejects a first non-conforming target object 107A-N. The object encoding array 108 deposits asynchronously the encoded target objects 134A-N in parallel onto the conveyor belt 112 of the object conveyor transport 114. The object conveyor transport 114 communicatively coupled with the production controller 100 collects the encoded target objects 134A-N deposited asynchronously in a parallel manner from the 'n' number of heterogeneous encoding assemblies 110A-N using the conveyor belt 112. The object conveyor transport 114 moves the encoded target objects 134A-N asynchronously in a serial manner using the conveyor belt 112 to a target object printer 142. The object conveyor transport 114 identifies and rejects a second non-conforming target object 107A-N.

Yet further, the target object printer 142 is communicatively coupled to the production controller 100 receives the encoded target objects 134A-N from the object conveyor transport 114 synchronously in a serial manner. The target object printer 142 synchronizes a particular encoded target object 134A-N with a particular user account (e.g., from the plurality of user accounts 115 in the identification database 115). The target object printer 142 prints on a surface of the particular encoded target object 134A-N based on the particular user account. The target object printer 142 identifies and rejects a third non-conforming target object 107.

The contactless encoding 135 may be a radio-frequency identification (RFID) enabled encoding and/or a Near-Field Communications (NFC) enabled encoding (e.g., using contactless encoders 105A-N). The contact based encoding may be a magnetic stripe based encoding (e.g., using asynchronous magnetic encoding 204). A UV DOD print process may be used to print variable data needed on each target object 107A-N. The triple interface encoding device may hold the target object 107 under the contactless encoder 105A-N until encoded via the contactless encoding 135. The contactless encoder 105A-N may be a Near-Field Communications (NFC) enabled encoder and/or a Radio Frequency Identification (RFID) encoder (e.g., RFID encoder 306A-N).

The RFID encoder 306A-N may first read an identifier to make synchronization (e.g., using object synchronization algorithm 122), encode the magnetic stripe, and/or print based on the UV DOD print process using an inkjet printer (e.g., using target object printer 142) on the front of each target object 107. The RFID encoder 306A-N may print a security code with a laser on the back of each target object 107A-N. The contactless encoding 135 may be at read and/or write rates of approximately between 212-848 kilobauds. The object encoding server 118 may configure the 'n' number of heterogeneous encoding assemblies 110A-N to write an object identifying portion of the encoding via contact based encoding. Further, the object encoding server 118 may configure the contactless RFID encoder(s) 306A-N to write the object authentication encoding portion contactlessly (e.g., using contactless encoding 135) to optimize the speed of encoding process.

The overall writing time for the target object 107A-N may be reduced in approximately one-half through automatic feeding of each of the target objects 107A-N synchronously in the target object feeder 106 and/or asynchronous encoding of the smart chip 406 of each of the target objects 107A-N.

The target object 107A-N may be a credit card, a loyalty card, a wrist wrap, a give-away, and/or an entry permit. The triple interface encoding device (e.g., as shown in network view 150, apparatus view 250) may encode the smart chip 406 of each of the target object 107A-N with an RFID encoding, a contact-based encoding, and/or a magnetic stripe encoding. The triple interface encoding device may partially encode the smart chip 406 of each of the target object 107A-N via the contact-based encoding using the 'n' number of heterogeneous encoding assemblies 110A-N and/or the contactless encoding 135 using the RFID encoder 306A-N to optimize the speed of encoding process. The production controller 100 may follow accurately the target objects 107A-N by means of photocells and/or shaft encoders along a production line. The production controller 100 may analyze and/or send data to and from sub-systems including any one of feeders (e.g., target object feeder 106), antennas (RFID encoder 306A-N), magnetic encoding (heterogeneous encoding assembly 110A-N 110A-N), inkjets (e.g., target object printer 142), cameras (e.g., vision-based verification apparatus 228, serial verification registration apparatus 226), and/or machine (e.g., object conveyor transport 114).

The 'n' number of contactless encoders 105A-N and/or heterogeneous encoding assemblies 110A-N may be utilized to process several target objects 107A-N in parallel to increase a speed of writing to a maximum throughput potential of the contact based encoding. The triple interface encoding device may transfer the encoded target objects 134A-N to a single inkjet printer (e.g., target object printer 142) for printing.

The 'n' number of heterogeneous encoding assemblies 110A-N may match (e.g., using indexing algorithm 312) the RFID encoder 306A-N at a repeat distance (e.g., corresponding repeat position 308) of each of the target objects 107A-N. The target object feeder 106 may be fed a number of target objects 107A-N equal to the number of contactless encoders 105A-N which are spaced (e.g., using encoder spacing 310) at a same repeat positions (e.g., corresponding repeat position 308) as the 'n' number of contactless encoders 105A-N. A number of contactlessly encoded target objects 134A-N equal to the number of heterogeneous encoding assemblies 110A-N may be positioned at a base of each heterogeneous encoding assembly 110A-N spaced at a same repeat positions as the 'n' number of heterogeneous encoding assemblies 110A-N.

The triple interface encoding device (e.g., as shown in network view 150, apparatus view 250) may index (e.g., using object synchronization algorithm 122) a conveyor belt 112 so the target objects 107A-N stop underneath the heterogeneous encoding assembly 110A-N before each target object 107A-N is encoded. The triple interface encoding device may write to the smart chip 406 via a particular heterogeneous encoding assembly 110A-N. When the object encoding server 118 receives a confirmation back that all of the writing is finished, then the triple interface encoding device may index into the next group.

The triple interface encoding device may be oriented into a triple terminal configuration to test each target object 107A-N after encoding to ensure functionality of each encoding through a fast check process in which a partial writing is done to check a unique identifier.

In another embodiment, a method of a triple interface encoding apparatus includes detecting a presence of a sequence of target objects 107A-N to tri-encode through a contactless encoding 135 in a target object feeder 106 of an object encoding array 108. The object encoding array 108 includes 'n' number of heterogeneous encoding assemblies 110A-N communicatively coupled to a production controller 100 arranged along a conveyor belt 112 of an object conveyor transport 114. The method includes associating one of a plurality of user accounts 115 with each of the target objects 107A-N of the target object feeder 106 communicatively coupled to the production controller 100 based on an identification database 116 of an object encoding server 118 and/or a custom labeling on a face of each target object 107A-N.

The object encoding server 118 configures data to be sent to the object encoding array 108 to contactlessly encode the data onto the target objects 107A-N associated with each of the plurality of user accounts 115 through one of the heterogeneous encoding assemblies 110A-N. The object encoding server 118 configures the target object feeder 106 to automatically deploy a number of target objects 107A-N equal to the number of heterogeneous encoding assemblies 110A-N onto the conveyor belt 112 of the object conveyor transport 114 spaced at corresponding repeat positions 308 as the number of heterogeneous encoding assemblies 110A-N. The object encoding server 118 configures the conveyor belt 112 of the object conveyor transport 114 to position the target object underneath the number of heterogeneous encoding assemblies 110A-N to encode the configured data onto the target object.

The method further includes automatically feeding each of the target objects 107A-N synchronously in the target object feeder 106 into one of the heterogeneous encoding assemblies 110A-N at a base of the target object feeder 106. The target objects 107A-N are differentiated through the custom labelling on the target objects 107A-N.

The method includes encoding asynchronously and/or contactlessly a smart chip 406 of each of the target objects 107A-N in the target object feeder 106 associated with each of the plurality of user accounts 115 through one of the heterogeneous encoding assemblies 110A-N.

In addition, the method includes encoding asynchronously and/or magnetically a contact based encoding on each of the target objects 107A-N associated with each of the plurality of user accounts 115 through one of the heterogeneous encoding assemblies 110A-N.

Further, the method includes depositing asynchronously the encoded target objects 134A-N in parallel onto the conveyor belt 112 of the object conveyor transport 114 communicatively coupled with the production controller 100 and collecting the encoded target objects 134A-N. Furthermore, the method includes moving the encoded target objects 134A-N asynchronously in a serial manner using the conveyor belt 112 to a target object printer 142 communicatively coupled to the production controller 100 and receiving the encoded target objects 134A-N.

Furthermore, the method includes synchronizing a particular encoded target object 134A-N with a particular user account and/or printing on a surface of the particular encoded target object 134A-N based on the particular user account.

The method of triple interface encoding apparatus may further include encoding each of the target objects 107A-N contactlessly using a radio-frequency identification (RFID) enabled encoding (e.g., using contactless encoder 105A-N, RFID encoder 306A-N) and/or a Near-Field Communications (NFC) enabled encoding (e.g., using contactless encoder 105A-N, RFID encoder 306A-N). The method may include the object encoding server 118 to position a dual terminal to verify a unique individual identifier of the smart chip 406 via contact to ensure it is functional and accurate. The method may further include advancing the confirmed target objects 107A-N to a Radio Frequency Identification (RFID) encoder 306A-N to encode contactlessly. Furthermore, the method may include encoding each of the target objects 107A-N using the heterogeneous encoding assemblies 110A-N with a contact based magnetic stripe encoding and printing a variable data needed on each target object 107A-N using a UV DOD print process (e.g., using an inkjet printer, a target object printer 142).

The method may include holding the target object 107 under the heterogeneous encoding assembly 110A-N until encoded via the contactless encoding 135 by reading an identifier to make synchronization, encoding the magnetic stripe, printing based on the UV DOD print process using an inkjet printer on a front of each target object 107A-N, and/or printing a security code with a laser on a back of each target object 107A-N. The heterogeneous encoding assembly 110A-N may be a Radio Frequency Identification (RFID) encoder (e.g., contactless encoder 105A-N, RFID encoder 306A-N).

The method may include matching the RFID encoder 306A-N at a repeat distance of each of the target objects 107A-N and feeding a number of target objects 107A-N equal to the number of heterogeneous encoding assemblies 110A-N which are spaced at a same repeat positions as the 'n' number of heterogeneous encoding assemblies 110A-N. The target object may be a credit card, a loyalty card, a wrist wrap, a give-away, and/or an entry permit. Further, the method may include indexing a belt so that the target objects 107A-N stops underneath the heterogeneous encoding assembly 110A-N before each target object 107A-N is encoded and writing to the smart chip 406 via a particular heterogeneous encoding assembly 110A-N. The smart chip 406 may include an RFID encoding, a contact-based encoding, and/or a magnetic stripe encoding. Additionally, the method may include receiving a confirmation back that all of the writing is finished, to be followed by indexing the next group in the triple interface encoding device.

In yet another embodiment, a triple interface encoding system includes a production controller 100 with a processor 102 and a memory 104 communicatively coupled with the processor 102 to detect a presence of a sequence of target objects 107A-N to be tri-encoded through a contactless encoding 135 in a target object feeder 106 of an object encoding array 108. The system includes 'n' number of heterogeneous contactless encoding assemblies (e.g., contactless encoders 105A-N, RFID encoder 306A-N) communicatively coupled with the production controller 100 arranged along a conveyor belt 112 of an object conveyor transport 114.

The system associates one of a plurality of user accounts 115 with each of the target objects 107A-N of the target object feeder 106 based on an identification database 116 of an object encoding server 118 communicatively coupled with the production controller 100 and/or a custom labeling on a face of each target object 107A-N.

The system configures data in the identification database 116 of the object encoding server 118 to be sent to the object encoding array 108 to encode the data onto the target objects 107A-N associated with each of the plurality of user accounts 115 through one of the heterogeneous contactless encoding assemblies (e.g., contactless encoders 105A-N, RFID encoder 306A-N). In addition, the system configures the target object feeder 106 to automatically deploy a number target objects 107A-N equal to the number of heterogeneous contactless encoding assemblies (e.g., contactless encoders 105A-N, RFID encoder 306A-N) onto the conveyor belt 112 of the object conveyor transport 114 spaced at corresponding repeat positions as the number of heterogeneous contactless encoding assemblies (e.g., contactless encoders 105A-N, RFID encoder 306A-N).

The system automatically feeds each of the target objects 107A-N synchronously in the target object feeder 106 into one of the heterogeneous contactless encoding assemblies (e.g., contactless encoders 105A-N, RFID encoder 306A-N) at a base of the target object feeder 106. The target objects 107A-N are differentiated through the custom labeling on the target objects 107A-N. The system encodes asynchronously and/or contactlessly a smart chip 406 of each of the target objects 107A-N in the target object feeder 106 associated with each of the plurality of user accounts 115 contactlessly through one of the heterogeneous contactless encoding assemblies (e.g., contactless encoders 105A-N, RFID encoder 306A-N).

The system encodes asynchronously and/or magnetically a contact based encoding on each of the target objects 107A-N in the target object feeder 106 associated with each of the plurality of user accounts 115 through one of the heterogeneous contactless encoding assemblies (e.g., contactless encoders 105A-N, RFID encoder 306A-N).

The system deposits asynchronously the encoded target objects 134A-N in parallel onto the conveyor belt 112 of the object conveyor transport 114 communicatively coupled with the production controller 100. Additionally, the system collects the encoded target objects 134A-N deposited asynchronously in a parallel manner from the 'n' number of heterogeneous contactless encoding assemblies (e.g., contactless encoders 105A-N, RFID encoder 306A-N) using the conveyor belt 112. The system moves the encoded target objects 134A-N asynchronously in a serial manner using the conveyor belt 112 to a target object printer 142 communicatively coupled to the production controller 100.

Further, the system receives the encoded target objects 134A-N from the object conveyor transport 114 asynchronously in a serial manner. Even further, the system synchronizes a particular encoded target object 134 with a particular user account and prints on a surface of the particular encoded target object 134 based on the particular user account.

The production controller 100 of the system may follow accurately the target objects 107A-N by means of photocells and/or shaft encoders along a production line.

The system may utilize 'n' number of heterogeneous contactless encoding assemblies (e.g., contactless encoders 105A-N, RFID encoder 306A-N) to process several target objects 107A-N in parallel to increase a speed of writing to a maximum throughput potential of the contact based encoding. The triple interface encoding device may transfer the encoded target objects 107A-N to a single inkjet printer (e.g., using target object printer 142). The system may encode the smart chip 406 to include an RFID encoding, a contact-based encoding, and/or a magnetic stripe encoding. The system may configure the object encoding server 118 to position a dual terminal to verify a unique individual identifier of the smart chip 406 via contact to ensure it is functional and accurate, and advance the confirmed target objects 107A-N to a Radio Frequency Identification (RFID) encoder 306A-N to encode contactlessly. The system may further configure the number of heterogeneous contactless encoding assemblies 110A-N of the object encoding array 108 to partially encode through a contact-based encoding and/or the RFID encoding to optimize the speed of encoding process.

The system may analyze and/or send data to and/or from sub-systems including any one of feeders, antennas, magnetic encoding, inkjets, cameras, and/or machine.

The system may further include the production controller 100 to use a UV DOD print process to print variable data needed on each target object 107A-N. The system may first read an identifier to make synchronization, encode the magnetic stripe, and/or print based on the UV DOD print process using an inkjet printer on a front of each target object 107A-N. The system may print a security code with a laser on each target object 107A-N. In addition, the system may reduce the overall writing time for the target object 107 to approximately one-half through automatic feeding of each of the target objects 107A-N synchronously in the target object feeder 106 and/or asynchronous encoding of the smart chip 406 of each of the target objects 107A-N.

FIG. 1 is a network view 150 illustrating a triple interface encoding device for encoding and printing of a plurality of target objects 107A-N through a contactless encoding 135 using a near-field communication enabled encoders of the triple interface encoding device, according to one or more embodiments. Particularly, FIG. 1 illustrates a production controller 100, a processor 102, a counter 103, a memory 104, a contactless encoder(s) 105A-N, a target object feeder 106, a target object 107A-N, an object encoding array 108, a heterogeneous encoding assembly 110A-N, a conveyor belt 112, an object conveyor transport 114, a plurality of user accounts 115, an identification database 116, an object encoding server 118, an object database 120, an object synchronization algorithm 122, an encoding assembly configuration data 124, an object deploying instruction 126, an encoding assembly configuration 128, an object synchronization data 130, a printing instructions 132, an encoded object 134, a contactless encoding 135, a status verification data 136, an object synchronization verification 138, a object status 140, and a target object printer 142, according to one embodiment.

The triple interface encoding device may include five main components: a production controller 100, an object encoding server 118, an object encoding array 108, a target object printer 142, and an object conveyor transport 114, according to one embodiment.

The production controller 100 may be a hardware device and/or a software program that manages and directs the flow of data between the object encoding server 118 and the object encoding array 108 to print and encode the triple interface objects (e.g., target objects 107) through contactless encoding 135 (e.g., using Near field communication). The production controller 100 of the triple interface encoding device may effectuate the object encoding server 118 to initialize a job, hand-shake with sub-systems to magnetically-encode and print information for target objects 107, and/or manage the NFC-enabled encoders (e.g., RFID encoder 306(A-N), contactless encoders 105A-N) to encode the target objects 107, according to one embodiment.

The production controller 100 may follow accurately the products (e.g., wearable object, target object 107) and/or cards (e.g., smart card) by means of a photocell and/or a shaft encoder (e.g., heterogeneous encoding assembly 110A-N, RFID encoder 306(A-N)) along a production line (e.g., object conveyor transport 114). The production controller 100 may send and/or gather data to and from sub-systems, such as feeders (e.g., target object feeder 106), antennas (e.g., NFC-enabled encoders, RFID encoder 306(A-N), contactless encoders 105A-N, magnetic encoders (e.g., heterogeneous encoding assembly 110A-N, RFID encoder 306(A-N)), inkjets (e.g., target object printer 142), cameras (e.g., object verification array 205), and machines (e.g., conveyor transport controller 236), etc. The production controller 100 may detect a presence of a sequence of target objects 107A-N that needs to be tri-encoded through the contactless encoding 135 using NFC-enabled encoders (e.g., RFID encoder 306(A-N), contactless encoders 105A-N). In addition, the production controller 100 may associate one of a plurality of user accounts 115 with each of the target objects 107 of the target object feeder 108 based on an identification database 116 of an object encoding server 118, according to one embodiment.

The processor 102 may be a logic circuitry that responds to and processes the basic instructions that drives the production controller 100. The counter 103 may be a record of encoded target objects 107 found to be non-conforming by the production controller 100 while encoding the target objects 107. The counter 103 may be used to keep track of the target objects 107 that are non-conforming, and/or otherwise failed to reach the target object printer 142 (e.g., due to jamming 231 in circle "7" and/or due to lost 233 in circle "8"). The memory 104 may be an electronic holding place for instructions and data that microprocessor of the production controller 100 can reach quickly, according to one embodiment.

The contactless encoder(s) 105A-N may be a device, a circuit, and/or a transducer, to contactlessly convert user data from one format and/or code to another for encrypting the user data onto the target object 107A-N for authentication of secured transaction and/or identification. The contactless encoder(s) 105A-N (e.g., RFID encoder 306A-N) may use short-distance wireless communication network (e.g., Near-Field Communication, IO-Link®) for connecting digital sensors and actuators to tri-encode the target objects 107A-N. The contactless encoder(s) 105A-N may use programmable sensing technology to encode the target objects 107A-N. The contactless encoder(s) 105A-N may be a software program and/or algorithm to wirelessly and contactlessly encrypt data onto the target objects 107A-N. The use of programmable sensing technology for encoding the target objects 107A-N may eliminate the moving (e.g., rotating) components in the contactless encoder(s) 105A-N to come in contact with the encoding surface of the target objects 107A-N. The elimination of surface contact with the moving (e.g., rotating) components of the contactless encoder(s) 105A-N with the target objects 107A-N may prevent residue formation and misalignment of its component and/or target objects 107A-N on the conveyor belt 112 while encoding, making it efficient, according to one embodiment.

The contactless encoder(s) 105A-N may use RAIN chip technology to automatically identify, track, and encode the target objects 107A-N contactlessly using radio waves. The use of RAIN chip technology in the contactless encoder(s) 105A-N may increase the speed of encoding to 212-848 KBd, thereby decreasing the encoding and/or writing time for each of the contactless encoder(s) 105A-N. The sensors in the contactless encoder(s) 105A-N may operate in an absolute contactless, wear-free environment. The contactless encoder(s) 105A-N may not be required to necessarily be aligned to its electrical connection and/or use correction factors in the production controller 100. The contactless encoder(s) 105A-N may be a fully encapsulated assembly having no moving parts inside the encoder to cause wearing of the assembly and/or moisture formation. The speed of writing using the RFID encoders 306A-N and/or contactless encoder(s) 105A-N may be faster than the contact-based writing and/or encoding system. A number of contactless encoder(s) 105A-N may process a plurality of target objects 107A-N in parallel and then hand off the contactlessly encoded target objects 107A-N to the inkjet printer for printing, according to one embodiment.

The target object feeder 106 may be an electromechanical device to deploy the target objects 107A-N onto the conveyor belt 112 of the object conveyor transport 114. The target object feeder 106 may be configured to automatically feed each of the target objects 107A-N synchronously into the NFC-enabled encoders (e.g., RFID encoder 306(A-N), contactless encoders 105A-N) and the heterogeneous encoding assembly 110A-N, according to one embodiment.

The target object feeder 106 may be a servo-controlled friction feeder. The target object feeder 106 may feed the target objects 107A-N onto a servo controlled vacuum transport (e.g., object conveyor transport 114) with a repeat that matches the contactless encoders 105A-N (e.g., RFID encoder 306 A-N) and/or antenna (e.g., heterogeneous encoding assembly 110A-N) positions. A single target object feeder 106 may be configured by the target object feeder 106 to concurrently feed a number of contactless encoders 105A-N (e.g., RFID encoder 306 A-N) at a repeat distance to match the contactless encoder 105A-N position, according to one embodiment.

In an alternate embodiment, the target object feeder 106 may be a multi-lane reciprocating feeder to process non-traditional products (e.g., target object 107), such as wearables (e.g., a smart watch, a fitness band, a medallion, a teatag, a wristband etc.) at a pre-configured distance to position each of the target object 107 underneath the NFC-enabled encoders (e.g., RFID encoder 306(A-N), contactless encoders 105A-N) and the heterogeneous encoding assembly 110A-N synchronously, according to one embodiment.

The target object 107A-N may be a triple interface card and/or a security token with an embedded chip that may be used for personal identification, authentication, data storage, and/or application processing, etc. The target object 107A-N may be encrypted with secured data to be used for financial transaction, mobile phones (SIM), public transit, computer security, schools, and/or healthcare services, etc. The target object 107A-N may be contactlessly encoded (e.g., using RFID interface, NFC-enabled encoders, RFID encoder 306 (A-N),) by the contactless encoders 105A-N and followed by heterogeneous encoding assembly 110A-N with contact and/or contactless read-write interfaces for secured transaction and/or authentication. The target object 107A-N may include a credit card, a loyalty card, a wrist wrap, a giveaway, a medallion, and/or an entry permit, etc., according to one embodiment.

The object encoding array 108 may be an arrangement of plurality of contactless encoders 105A-N and/or heterogeneous encoding assemblies 110A-N to be used for contactlessly encoding the target objects 107A-N with contact and/or contactless read-write interfaces. The object encoding array 108 may be positioned along the conveyor belt 112 of the object conveyor transport 114, according to one embodiment.

The heterogeneous encoding assembly 110A-N may be a group of dissimilar standards-conforming hardware and/or software programs that can interoperate to tri-encode the target objects 107A-N with contact and/or contactless read-write interfaces. Each of the heterogeneous encoding assembly 110A-N in the object encoding array 108 may be programmed to magnetically encode the configured data onto the target objects 107A-N associated with each of the plurality of user accounts 115, according to one embodiment.

The conveyor belt 112 may be a continuous moving band of fabric, rubber, and/or metal used for transporting the target objects 107A-N to the base of the contactless encoders 105A-N and/or heterogeneous encoding assembly 110A-N for encoding and/or printing (e.g., UV DOD printing). The conveyor belt 112 may be configured to position the target objects 107A-N underneath the number of contactless encoders 105A-N and/or heterogeneous encoding assemblies 110A-N to allow contactless encoding 135 of the configured data onto the target object 107, according to one embodiment.

The object conveyor transport 114 may be a horizontal, inclined and/or vertical device for moving and/or transporting target objects 107A-N in a path predetermined by the object encoding server 118 and may have points of loading and/or discharge configured by the object encoding server 118. The object conveyor transport 114 may allow positioning of the target objects 107A-N underneath the contactless encoders 105A-N and/or heterogeneous encoding assemblies 110A-N for encoding, according to one embodiment.

The identification database 116 may be a collection of user account information to be associated with each of the target object 107A-N in the target object feeder 106 that is organized so that it can be easily accessed, managed and/or updated by the object encoding server 118. For Example, the identification database 116 may contain the user profile of each user, unique identifier (e.g., UID) of each user and total number of records, etc., according to one embodiment.

The object encoding server 118 may be a computer, a device and/or a program that is dedicated to manage network resources to encode the target objects 107A-N. The object encoding server 118 may initiate a job to encode a number of target objects 107A-N. The object encoding server 118 may retrieve the user account information (e.g., plurality of user accounts 115) to be associated with each of the target object 107A-N from the identification database 116. Additionally, the object encoding server 118 may handshake with the production controller 100 to initialize a job. Further, the object encoding server 118 may configure each of the contactless encoders 105A-N and the heterogeneous encoding assembly 110A-N in the object encoding array 108 to tri-encode the target object 107A-N. The object encoding server 118 may transmit back the configured data to the production controller 100, including the record number, the number of configured contactless encoders 105A-N and heterogeneous encoding assembly 110A-N station, tracking data and/or printable texts (e.g., up to 10) to be printed onto the target objects 107A-N. In one embodiment, all the data in the object encoding server 118 may be encrypted, making it PCI compliant. The production controller 100 may not be involved in handling the secured encrypted data, according to one embodiment.

The object database 120 may be a collection of data of the target objects 107A-N to be tri-encoded contactlessly (e.g., using contactless encoding 135) by the contactless encoders 105A-N. The object database 120 may include the real-time data of each of the target objects 107A-N being encoded by the contactless encoders 105A-N and the heterogeneous encoding assembly 110A-N to verify the precision and/or accuracy of encoding and printing of the target objects 107A-N based on the configured data (e.g., encoding assembly configuration data 124, object synchronization data 130), according to one embodiment.

The object synchronization algorithm 122 may be a sequence of steps to be carried out to ascertain the accuracy and synchronization of the contactlessly encoded target objects 107A-N by the contactless encoders 105A-N before starting encoding by the heterogeneous encoding assembly 110. The production controller 100 may read the UID of each of the contactlessly encoded target objects 107A-N associated with each of the configured heterogeneous encoding assembly 110 to verify synchronization at the beginning of further processing, according to one embodiment.

The encoding assembly configuration data 124 may be a configured set of information to assign a particular contactless encoder 105A-N and heterogeneous encoding assembly 110 to tri-encode a specific target object with associated user data. The encoding assembly configuration data 124 may be sent by the object encoding server 118 to the production controller 100, according to one embodiment.

The encoding assembly configuration data 124 may contain the IP number of the particular contactless encoder 105A-N and the corresponding user data retrieved from the identification database 116 to contactlessly encode the specific target object associated with the particular user data, according to one embodiment.

The encoding assembly configuration data 124 may be pre-configured by the object encoding server 118 and sent to the production controller 100 at the time of initialization of a particular job, according to one embodiment.

Further, the encoding assembly configuration data 124 may contain the IP number of the particular heterogeneous encoding assembly 110A-N and the corresponding user data retrieved from the identification database 116 to tri-encode the specific target object associated with the particular user data, according to one embodiment.

The object deploying instruction 126 may be a directive sent to the target object feeder 106 by the production controller 100 to automatically position each of the target objects 107A-N at the base of the particular contactless encoder 105A-N based on the encoding assembly configuration data 124. Further, the object deploying instruction 126 may be a directive sent to the target object feeder 106 by the production controller 100 to automatically position a specific target objects 107A-N associated with the particular heterogeneous encoding assembly 110A-N based on the encoding assembly configuration data 124, according to one embodiment.

The encoding assembly configuration 128 may be the process of making the arrangement and/or setting up a particular contactless encoder 105A-N and heterogeneous encoding assembly 110 to perform a specific task of encoding a particular target object 107A-N. The object encoding server 118 may set various switches and jumpers (e.g., for hardware) and/or define values of parameters (e.g., for software) for each of the contactless encoder 105A-N and the heterogeneous encoding assembly 110 at the beginning of an encoding job, according to one embodiment.

The object synchronization data 130 may be a set of information sent to each of the heterogeneous encoding assembly 110 to synchronously print and encode a particular target object. The object encoding server 118 may send the object synchronization data 130 to each of the contactless encoder 105A-N and the heterogeneous encoding assembly 110 assigned with a specific print and/or encoding job. The printing instructions 132 may be a directive sent to the target object printer 142 to print the encoded target object 134 by the object encoding server 118 using a UV DOD inkjet printer, according to one embodiment.

The encoded object 134 may be the number of target objects encrypted and/or coded by the number of contactless encoder 105A-N and the corresponding heterogeneous encoding assemblies 110A-N, according to one embodiment.

The contactless encoding 135 may be the process of converting user data into a format required for a number of information processing needs using a radio-frequency identification (RFID) enabled encoding and/or a Near-Field Communications (NFC) enabled encoding onto the target objects 107A-N by the contactless encoders 105A-N. The contactless encoding 135 in the target objects 107A-N may include embedded integrated circuits that can process and/or store data, and communicate with a decoder and/or read interfacing terminal via radio waves, according to one embodiment.

The status verification data 136 may be the information sent by the object encoding server 118 to the production controller 100 including the number of encoded target objects 134 along with their unique identity UID numbers for establishing accuracy of encoding at the time of a particular encoding job. The status verification data 136 may include the record of encoded target objects that were encoded accurately, non-conforming and/or rejected, according to one embodiment.

The object synchronization verification 138 may be the process of reading the unique identity UID numbers of the encoded target objects 134 by the production controller 100 at the beginning of printing the target objects 107 to ascertain the synchronization of the target objects 107, according to one embodiment.

The object status 140 may be the statistics of encoded and/or printed target objects along with its UID, sent by the production controller 100 to the target object server 118. The object status 140 may include the condition of correctly encoded and/or printed and/or non-conforming target objects after completion of encoding and/or printing of the target objects. The target object printer 142 may be a drop-on-demand inkjet printer to print the encoded target objects, according to one embodiment.

An encoding job may be opened in the object encoding server 118. The object encoding server 118 may retrieve the user data from the identification database 116. The object encoding server 118 may handshake with the production controller 100. In circle '1', the object encoding server 118 may configure the contactless encoders 105A-N (e.g., using encoding assembly configuration 128) and send the encoding assembly configuration data 124 to the production controller 100. In circle '2', the production controller 100 may send object deploying instructions 126 to the target object feeder 106 to deploy a specific number of target objects based on the encoding assembly configuration data 124. In circle '3', the object encoding server 118 may handshake with the contactless encoders 105A-N to encode the target objects contactlessly based on the encoding assembly configuration 128, according to one embodiment.

In circle '4', the object encoding server 118 may send the record of contactlessly encoded objects to the production controller 100 through the object status 140. In circle '5', the object encoding server 118 may send the object synchronization data 130 to the heterogeneous encoding assembly 110A-N. In circle '6', the production controller 100 may read the UID of the contactlessly encoded objects to ensure synchronization of the contactlessly encoded objects using object synchronization verification 138. In circle '7', status verification data 136 of the magnetically encoded target objects may be sent to the object encoding server 118. In circle '8', the production controller 100 may send the printing instructions 132 to the target object printer 142. In circle '9', the production controller 100 may send the final status of encoded and printed target objects to the object encoding server 118, according to one embodiment.

Figure 2:
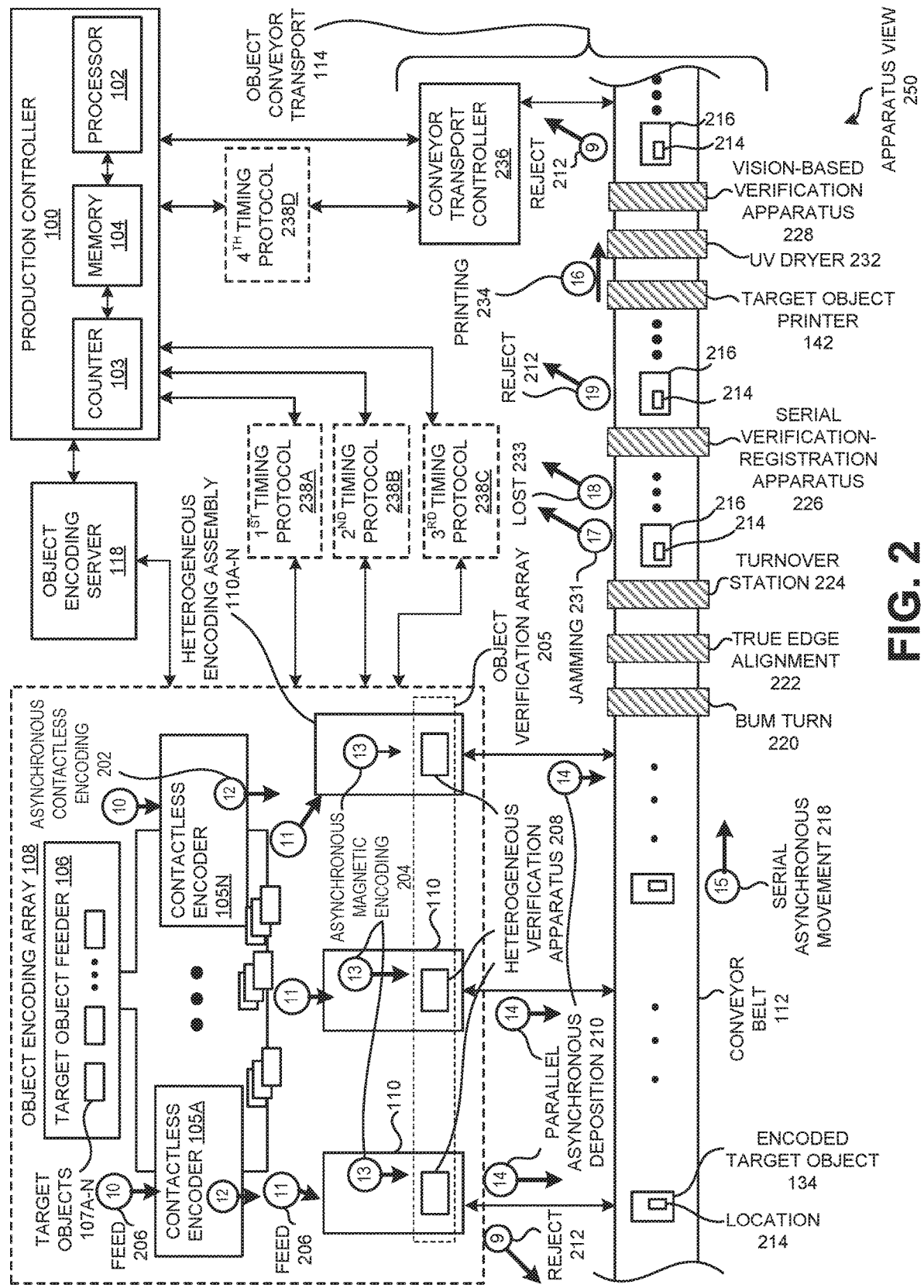
FIG. 2 is an apparatus view of the triple interface encoding device of FIG. 1 illustrating the encoding of plurality of target objects asynchronously in parallel using the contactless encoders and heterogeneous encoding assemblies of an object encoding array through a contactless encoding, moving the encoded target objects serially using a conveyor belt of an object conveyor transport, and printing on surfaces of the target objects using a target object printer, according to one embodiment.

FIG. 2 is an apparatus view 250 of the triple interface encoding device of FIG. 1 illustrating the encoding of plurality of target objects 107A-N asynchronously in parallel using the contactless encoders 105A-N and heterogeneous encoding assemblies 110A-N of an object encoding array 108 through a contactless encoding 135, moving the encoded target objects 134A-N serially using a conveyor belt 112 of an object conveyor transport 114, and printing on surfaces of the target objects 107A-N using a target object printer 142, according to one embodiment The production controller 100 may communicate with the object encoding array 108, the object verification array 205, the object conveyor transport 114, the serial verification-registration apparatus 226, the vision-based verification apparatus 228, the target object printer 142, and/or the UV dryer 232. According to one embodiment, the production controller 100 may initiate, control, track, manage, synchronize, verify, accept, reject, and/or oversee the following:

(a) the feeding of the target objects 107A-N from the target objects feeder 106 to the contactless encoder 105A-N in parallel (e.g., using feed 206 in circle "10"), followed by positioning of the contactlessly encoded target objects 107A-N to the base of heterogeneous encoding assembly 110 A-N in parallel (e.g., using feed 206 in circle "11"), (b) asynchronous contactless encoding of the smart chips 406 of the target objects 107A-N using NFC encoders (e.g., contactless encoder 105A-N, RFID encoder 306) based on associated user accounts 115A-N custom labelling in parallel using the object encoding array 108 (e.g., using asynchronous contactless encoding 202 in circle "12", (c) asynchronous magnetic encoding of magnetic stripe of the target objects 107A-N and custom labelling in parallel using the object encoding array 108 (e.g., using asynchronous magnetic encoding 204 in circle "13"), (d) asynchronous verification of the magnetic encoded data in the magnetic stripes of the encoded target object 134 based on the associated user accounts 115 (e.g. using object verification array 205, serial verification-registration apparatus 226, vision-based verification apparatus 228), (e) asynchronous deposition of the encoded target object 134 onto the conveyor belt 112 of the object conveyor transport 114 in parallel by the heterogeneous encoding assemblies 110A-N (e.g., using parallel asynchronous deposition 210 in circle "14"), (f) transport of the encoded target object 134 with associated locations 214 to the target object printer 142 in a serial manner by the conveyor belt 112 of object conveyor transport 114 (e.g., using serial asynchronous movement 218 in circle "15"), (g) synchronization of the encoded target objects 107A-N with associated user accounts 115 (e.g. using serial verification-registration apparatus 226), (h) printing on a front surface of the encoded target object 134 using the target object printer 142 (e.g., using printing 234 in circle "16"), (i) printing a security code with a laser on a back surface of the encoded target object 134 using the target object printer 142 (e.g., using printing 234 in circle "16"), (j) verification of encoded target object 134 (e.g., parallel verification using the object verification array 205, serial verification using the serial verification-registration apparatus 226, and/or vision-based verification using the vision-based verification apparatus 228), and/or (j) rejection of encoded target object 134 determined to be non-conforming (e.g., using reject 212 of circle "19") to the configured user data.

The production controller 100 may associate one of a plurality of user accounts 115 of an identification database 116 with each target object 107 (e.g., using association 404), according to one embodiment.

The object encoding array 108 may include 'n' number of contactless encoders 105A-N, 'n' number of heterogeneous encoding assembly 110 and a target objects feeder 106. The object encoding array 108 may be communicatively coupled with the production controller 100. The contactless encoders 105A-N may contactlessly encode (e.g., using asynchronous contactless encoding 202 in circle "12") the smart chips 406 and the heterogeneous encoding assemblies 110A-N may magnetically encode (e.g., asynchronous magnetic encoding 204 in circle "13") the magnetic stripes (e.g., magnetic stripe) of target objects 107A-N. Each contactless encoder 105A-N and heterogeneous encoding assembly 110 may be associated with the target object feeder 106 which may feed 206 target objects 107A-N individually into the contactless encoder 105A-N and heterogeneous encoding assembly 110. Each contactless encoder 105A-N and heterogeneous encoding assembly 110 may also deposit encoded target object 134 onto the conveyor belt 112 of the object conveyor transport 114, according to one embodiment.

The object conveyor transport 114 may include a conveyor belt 112, a conveyor transport controller 236, burn turn 220, true edge alignment 222, and/or turnover station 224 for the transport of the encoded target object 134 from the object encoding array 108 to the target object printer 142, according to one embodiment.

The target object printer 142 may be associated with a UV dryer 232 to print (e.g., printing 234 in circle "16") on a top surface using UV DOD inkjet printer and/or bottom face of target object with a laser for each target object 107 and to cure the printing 234 (e.g., using UV dryer 232), according to one embodiment.

A heterogeneous verification apparatus 208 of an object verification array 205 may be associated with a heterogeneous encoding assembly 110 to perform parallel verification of the encoded target object 134 to ensure that the magnetically encoded data in the magnetic stripe and contactless encoded data in the smart chip 406 in a target object 107 are accurately encoded and are consistent based on an associated user account 402, according to one embodiment.

A serial verification-registration apparatus 226 may be associated with the object conveyor transport 114 and the target object printer 142 to perform serial verification and registration of each encoded target object 134 to identify/re-identify, verify and/or register the encoded target object 134 and the associated user account 402, according to one embodiment.

A vision-based verification apparatus 228 may be associated with the object conveyor transport 114 and the target object printer 142 to perform vision-based verification/registration to verify, identify, and/or register the encoded target object 134 based on printed text, printed pattern, custom labeling pattern, and/or blemish in images of the target object 107 captured before and/or after the printing 234 in circle "16" by the target object printer 142, and the associated user account 402, according to one embodiment.

The production controller 100 may issue commands to and/or collect feedbacks from the object encoding array 108, the object conveyor transport 114, the target object printer 142, the object verification array 205, the serial verification registration apparatus 226, and the vision-based verification apparatus 228 for a target object production run of making certain amount of target objects 107A-N with associated user accounts 402 and corresponding custom labeling. The production controller 100 may be communicatively coupled with the object encoding array 108, the object conveyor transport 114, the target object printer 142, the UV dryer 232, the object verification array 205, the serial verification-registration apparatus 226, and/or the vision based verification apparatus 228, according to one embodiment.

During the object production run, the production controller 100 may monitor the operations of the object encoding array 108, the object conveyor transport 114, the target object printer 142, the object verification array 205, the serial verification-registration apparatus 226, and vision-based verification apparatus 228. The production controller 100 may detect a presence of target objects 107A-N in the target objects feeder 106, according to one embodiment.

The production controller 100 may associate user accounts 115 with the target objects 107A-N. One user account 402 may be associated with one target object 107. A user account 402 may also be associated with two or more target objects 107A-N, as a user may apply for supplementary cards, and/or a user may apply for multiple cards simultaneously. Each of the two or more associated target objects 107A-N may need to be printed individually as they are different/distinct cards, according to one embodiment.

All the target objects 107A-N in the target object feeder 106 may be totally committed/associated with the user accounts 115. The target objects feeder 106 may hold target objects 107A-N with different custom labelling, according to one embodiment.

In an example embodiment, target objects 107A-N with different custom labelling may be mixed in the same target object feeder 106. Vision-based techniques (e.g., a variation of that used in vision-based verification apparatus 228) and/or other techniques may be employed to recognize and register the target objects 107A-N with the different custom labeling before the association 404 with user accounts is performed and/or established, according to one embodiment.

The smart chip 406 of the target object 107 may be a microcontroller chip or a memory chip. The target object 107 may be a contact card and/or a contactless card. The heterogeneous encoding assemblies 110A-N may be commercially available printers for target objects 107A-N. The 'n' number of heterogeneous encoding assemblies 110A-N may be heterogeneous, of different brands, and/or different models, with different feeding, contactless reading, contactless encoding, magnetic reading, magnetic encoding, depositing, and/or rejection characteristics, according to one embodiment.

The conveyor belt 112 may be a carrying medium of a belt conveyor system. The conveyor belt 112 may consists of two or more pulleys (or drums), with an endless loop of carrying medium, the conveyor belt, that rotates about them. One or both of the pulleys are powered, moving the belt and the material on the belt forward, according to one embodiment.

The target object printer 142 may be a single-sided target object printer 142. It may also be a double-sided target object printer 142. It may laminate the target object 107. It may use retransfer printing technology. It may be a high volume, standard volume and/or low volume object printer, according to one embodiment.

In another embodiment, the target object printer 142 may be an inkjet printer to recreate a digital image by propelling droplets of ink, solvent, and/or water based ink onto the target object 107A-N. In one more embodiment, the target object printer 142 may be a UV DOD inkjet printer and/or a laser printer.

In the target object production run, in circle "10", target objects 107A-N in the target object feeder 106 may be fed individually into the contactless encoders 105A-N. The feeding among the 'n' number of contactless encoders 105A-N may be asynchronous, occurring at a time independent of other contactless encoders 105A-N at a rate independent of other contactless encoders 105A-N, according to one embodiment.

In circle "12", asynchronous contactless encoding 202 of the smart chips 406 of the target objects 107A-N may be performed by the contactless encoder 110A-N. Communication with the target objects 107A-N may first be established using a contactless communication (e.g., radio frequency, IO-Link®, Near-Field Network). Authentication and encryption may be used for secure communication.

The contactless encoding may be asynchronous because different contactless encoder 110A-N performs the operations independently. The asynchronous contactless encoding 202 may utilize a first 'n' number of independent and asynchronous timing protocol (e.g., first timing protocol 238A based on object synchronization algorithm 122) in which the contactless encoding operations of one contactless encoder 110 commence independent of other encoding assemblies 110 at a first rate (possibly irregular) independent of other encoding assemblies, according to one embodiment.

In circle "13", asynchronous magnetic encoding 204 of the magnetic stripes of the target objects 107A-N may be performed by the heterogeneous encoding assemblies 110A-N. The magnetic encoding is asynchronous because different heterogeneous encoding assemblies 110A-N perform the operations independently. The asynchronous magnetic encoding 204 may utilize a second 'n' number of independent and asynchronous timing protocol (e.g., second timing protocol 238B) in which the magnetic encoding operations of one heterogeneous encoding assembly 110 commences independent of other encoding assemblies at a second rate independent of other encoding assemblies, according to one embodiment.

Within a heterogeneous encoding assembly 110, the asynchronous contactless encoding 204 and the asynchronous magnetic encoding 204 may commence at different time, according to one embodiment.

A target object 107 failing the asynchronous contactless encoding 202 and/or the asynchronous magnetic encoding 204 may be determined to be non-conforming, and may be rejected (e.g., reject 212) in circle "19". A non-conforming target object 107 may be rejected by the object encoding array 108. A non-conforming target object 107 may also be rejected along the conveyor belt 112 either before or after the printing by the target object printer 142. The target object printer 142 may skip printing for the non-conforming chip-cards that pass through it, according to one embodiment.

After the asynchronous contactless encoding 204 in circle "12" and the asynchronous magnetic encoding 204 in circle "13", the encoded target object 134 may be verified in the object verification array 205. The object verification array 205 may include 'n' number of heterogeneous verification apparatuses 208 associated with the 'n' number of heterogeneous encoding assemblies 110A-N. Each heterogeneous verification apparatus 208 may communicate asynchronously with the smart chips 406 of the encoded target objects 134 and may verify asynchronously the contactless encoded data in the smart chips 406 of the encoded target object 134 based on the associated user accounts 115. Each heterogeneous verification apparatus 208 may also read asynchronously with the magnetic stripes of the encoded target object 134 and verify asynchronously the magnetic encoded data in the magnetic stripes of the encoded target object 134 based on the associated user accounts 115. Each heterogeneous verification apparatus 208 may verify asynchronously that the contactlessly encoded data and the magnetic encoded data are consistent based on the associated user accounts 115. Any encoded target object 134 failing the verification may be determined to be non-conforming and may be rejected (e.g., reject 212) in circle "19". Rejected target objects may be collected in one or more collection bin(s), according to one embodiment.

The counter 103 may be used to keep track of target objects 107A-N that are non-conforming, and/or otherwise failed to reach the target object printer 142 (e.g., due to jamming 231 in circle "17" and/or due to lost 233 in circle "18"). The production controller 100 may issue new commands to the object encoding array 108, the object conveyor transport 114, and the target object printer 142 to re-make those target objects 107A-N. The remaking command may be issued without waiting so that the re-making task is merged with the current and/or the next runs of making target objects 107A-N. Alternatively, the remaking command may be issued after waiting some time so that a certain amount of unsuccessful target objects 107A-N (e.g., 500) can be re-made in a new run, and/or in the same run, according to one embodiment.

The object encoding array 108 may deposit the encoded target object 134 in parallel onto a conveyor belt 112 for transport (e.g., serial asynchronous movement 218 in circle "5") to the target object printer 142. In circle "14", parallel asynchronous deposition 210 is done by the object encoding array 108 of 'n' heterogeneous encoding assemblies 110A-N. It may be done in parallel as the heterogeneous encoding assemblies 110A-N are depositing in parallel, without waiting for other heterogeneous encoding assemblies 110A-N. It may use a third timing protocol 238C to include a third set of 'n' number of independent and asynchronous timing protocols for the 'n" number of heterogeneous encoding assemblies 110A-N. The depositing operations of one heterogeneous encoding assembly 110 may commence independent of other encoding assemblies at a third rate independent of other encoding assemblies, according to one embodiment.

In circle "15", the encoded target object 134 deposited in parallel by the heterogeneous encoding assembly 110 may be moved in a serial asynchronous movement 218. The conveyor belt 112 effectively performs a parallel-to-serial conversion mechanically. The spacing among consecutive encoded target object 134 may be irregular, according to one embodiment.

The object conveyor transport 114 may utilize a fourth timing protocol 238D in which the encoded target object 134 may reach the target object printer 142 in a serial manner asynchronously at irregular time intervals, according to one embodiment.

When initially deposited, the encoded target object 134 may have their magnetic stripes at an angle (e.g., approximately 90 degrees, i.e., perpendicular) to the serial asynchronous movement 218 of the encoded target object 134 on the conveyor belt 112, which is inconvenient for high-speed magnetic reading (e.g., to be performed in the serial verification-registration apparatus 226). The encoded target object 134 may be rotated horizontally for an angle (e.g., 90 degrees) using burn turns 220 so that the magnetic stripes of the encoded target object 134 are roughly aligned. The encoded target object 134 may further be aligned against a true edge (e.g., true edge alignment 222) of the conveyor belt 112. The encoded target object 134 may be flipped upside-down using a turnover station 224, so that printing 234 on the top face of the target object and/or the bottom face of target object is possible. The movement of the conveyor belt 112, the burn turn 220, the true edge alignment 222 and turnover station 224 of the object conveyor transport 114 may be controlled by the conveyor transport controller 236 in communication with the production controller 100, according to one embodiment.

Because of the parallel asynchronous deposition 210 of encoded target object 134 onto the conveyor belt 112, there is some uncertainty in the identity of the encoded target object 134 as they are moved on the conveyor belt. The serial verification-registration apparatus 226 may re-identify, and/or register (and/or re-synchronize with) the encoded target objects 134 by reading the magnetic stripes of the encoded target object 134 and checking the magnetic encoded data in the magnetic stripe against the identification database 116 to find the associated user accounts 115. The aligned magnetic stripes by the combination of burn turns 220, true edge alignment 222 and/or turnover station 224 may make high-speed reading of the magnetic stripes possible, according to one embodiment.

Alternatively, the serial verification-registration apparatus 226 may re-identify, and/or register (and/or re-synchronize with) the encoded target object 134 by communicating with the smart chips 406 of the encoded target object 134 and checking the contactless encoded data in the smart chips 406 against the identification database 116 to find the associated user accounts 115. The alignment by the combination of burn turns 220, true edge alignment 222 and/or turnover station 224 may help in the high-speed communication (contact or contactless) with the smart chips 406 possible, according to one embodiment.

In circle "16", the target object printer 142 performs printing 234 on a surface of the encoded target object 134 (e.g., top face of target object and/or bottom face of target object) with an associated UV dryer 232 to cure the printing. The target object printer 142 may print on two sides (e.g., both the front surface and/or rear surface of target object) of the encoded target object 134. The target object printer 142 may print on one (e.g., front surface of target object) of the encoded target object 134, send the encoded target object 134 to the turnover station 224 and laser print a security code on the other side (e.g., rear surface of target object) of the encoded target object 134, according to one embodiment.

The printing 234 may include printed text and/or printed pattern using a UV DOD printer. The printed text may include user name, and other user personal information (e.g. address, phone number, etc.). The printed text may also include an identifiable number (e.g., credit card number, debit card number, payment account number, staff number, membership number, social security number, driver license number, etc.), and associated information (e.g. expiration date, starting date of membership/staff/driver license, etc.), according to one embodiment.

A vision-based verification apparatus 228 may be used to analyze captured images of the encoded target object 134 using computer vision techniques to identify and recognize printed text (e.g., card number, user name, expiration date, and/or other user/card information, etc.) and/or patterns (e.g., printed pattern, bar-code, and/or custom labeling pattern) and to compare with associated user accounts to ensure integrity and consistency among the printed data, the magnetic encoded data and the contactless encoded data. Any encoded target object 134 with visible blemish (e.g., incorrect/incomplete/unclear/smeared printed text and/or printed pattern, incorrect/incomplete/unclear/smeared barcode, incorrect color, incorrect background pattern/background artwork, etc.).

Any encoded target object 134 failing any verification (e.g., parallel verification by the object verification array 205, serial verification by the serial verification registration apparatus 226, visual verification by the vision-based verification apparatus 228) may be determined to be non-conforming. The non-conforming encoded target object 134 may be rejected at some point during the whole target object encoding and printing process. Some other target objects 107 may be lost due to jamming 231 and/or lost 233, according to one embodiment.

The production controller 100 may track each target object 107 and detect whether the encoding and/or printing of the target object 107 is successful. The non-conforming target objects 107A-N may be re-made (re-encoded and/or re-printed) in either the current run or a future run, according to one embodiment.

Figure 3:
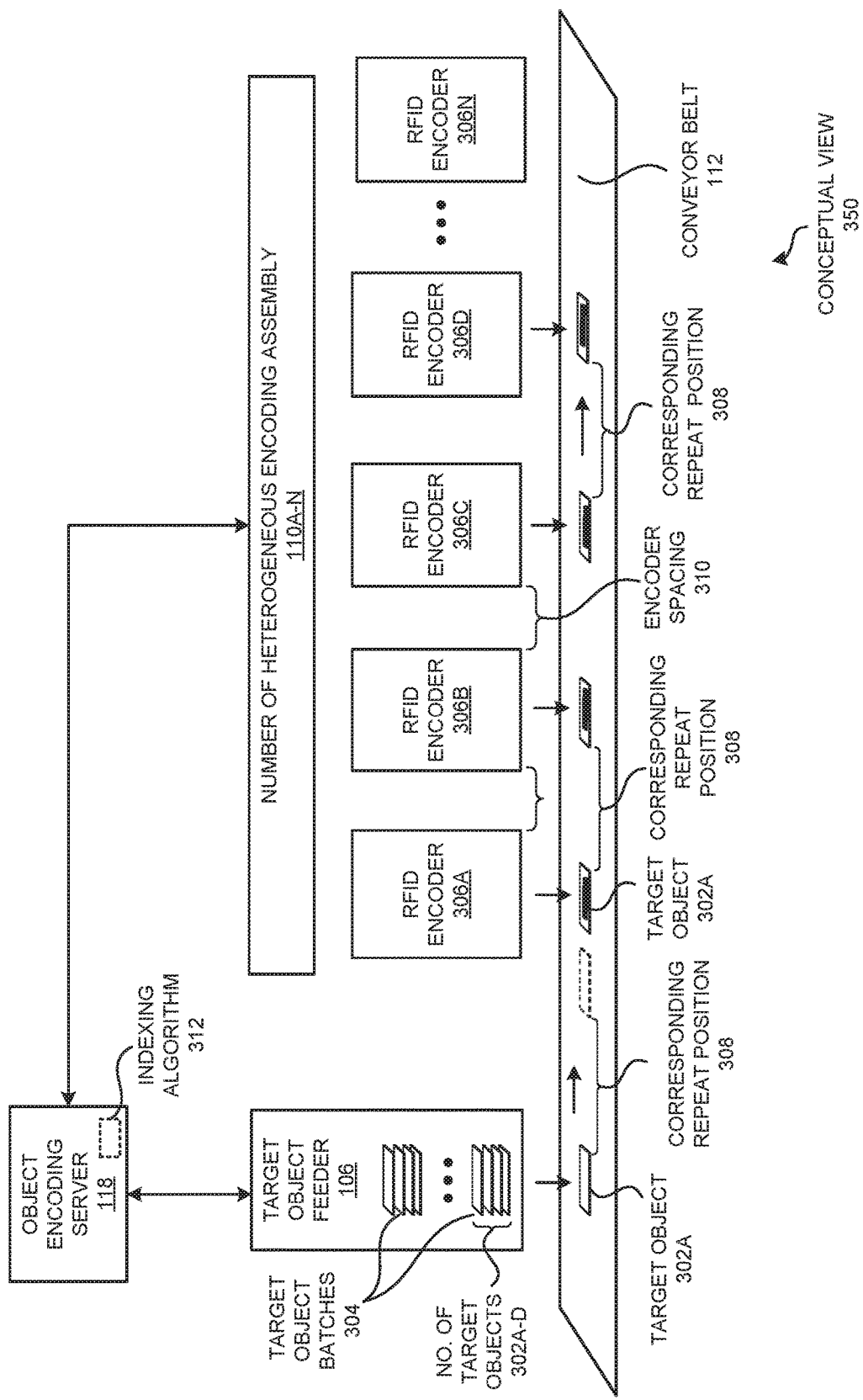
FIG. 3 is a conceptual view of the triple interface encoding device of FIG. 1 illustrating configuration of the target object feeder by an object encoding server to automatically deploy a number of target objects equal to the number of heterogeneous encoding assemblies onto the conveyor belt of the object conveyor transport spaced at corresponding repeat positions as the number of heterogeneous encoding assemblies, according to one embodiment.

FIG. 3 is a conceptual view 350 of the triple interface encoding device of FIG. 1 illustrating configuration of the target object feeder 106 by an object encoding server 118 to automatically deploy a number of target objects 107A-N equal to the number of RFID encoder(s) 306A-N onto the conveyor belt 112 of the object conveyor transport 350 spaced at corresponding repeat positions 308 as the number of RFID encoder 306A-N, according to one embodiment.

In an example embodiment, the object encoding server 118 may open an encoding and printing job to tri-encode a number of target objects through RFID encoders 306A-N. The object encoding server 118 may access the identification database 116 to retrieve the user data from the plurality of user accounts 116. The object encoding server 118 may configure the user data to be sent to each of the RFID encoders 306A-N in a number of batches (e.g., target object batches 304). The object encoding server 118 may configure the target object feeder 106 to deploy a number of target objects 302A-D onto the conveyor belt 112 of the object conveyor transport with a repeat distance to match the RFID encoders 306A-306D position. The target object feeder 106 may deploy the number of target objects 302A-D in a single batch to contactlessly encode each of the the target objects concurrently using RFID encoders 306A-306D. The object encoding server 118 may configure each of the RFID encoder 306A with a specific target object printing and encoding job. The RFID encoders 306A-N may use radio waves to identify, track and encode the target objects 302A-D based on the assigned encoding job.

The object encoding server 118 may further configure the conveyor belt 112 (e.g., using indexing algorithm 312) to position each of the target objects underneath the corresponding RFID encoders 306A-306N at the corresponding repeat position 308, according to one embodiment.

For example, the object encoding server 118 may configure RFID encoders 306A-D to contactlessly and synchronously encode each of the target objects 302A-D simultaneously based on the configured user data retrieved from the identification database 116 for an increased throughput rate. The object encoding server 118 may configure and index (e.g., using indexing algorithm 312) a second batch of target objects for encoding once a first batch of target objects are encoded via RFID encoders 306A-D, according to one embodiment.

Figure 4:
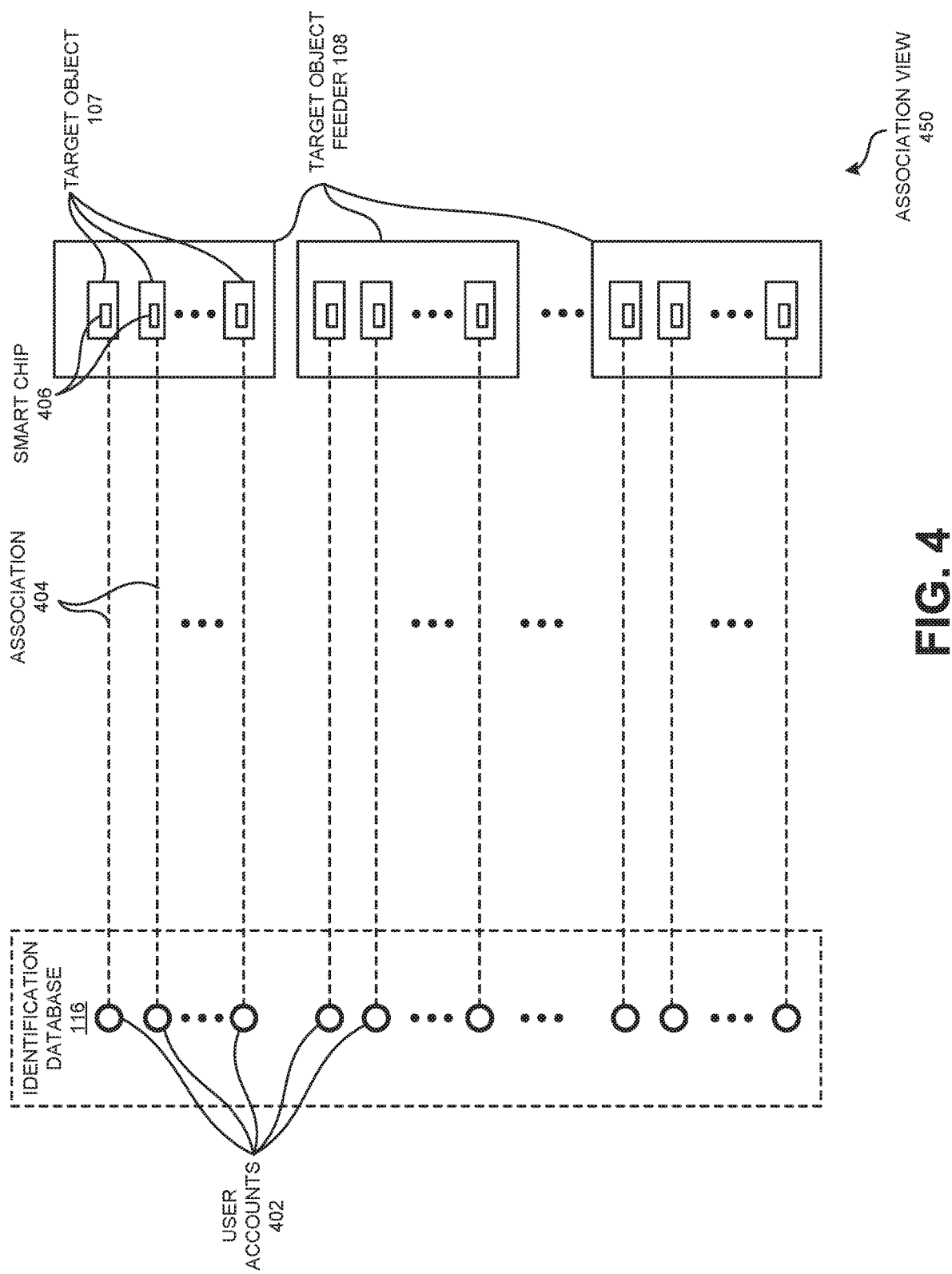
FIG. 4 is an association view illustrating the relationship between the plurality of user accounts with each of the target objects of the target object feeder based on an identification database of an object encoding server of FIG. 1, according to one embodiment.

FIG. 4 is an association view 450 illustrating the relationship between the plurality of user accounts 115 with each of the target objects 107 of the target object feeder 106 based on an identification database 116 of an object encoding server 118 of FIG. 1, according to one embodiment.

An identification database 116 may include a list of user accounts 402 associated with the target object 107 to be encoded and printed. A specific target object 107 may be associated with a particular user account 402. The user account 402 in the identification database 116 may include user information (e.g., user name, address, phone number, driver license number, social security number, and/or membership number, etc.) and card information (e.g., card number, membership number, expiration date, SSV code, starting data of membership, etc., card type, custom labeling, etc.) related to the target object 107 to be printed. The user account 402 may be used to provide the contactlessly encoded data for the smart chips 406 of the target object 107 in the asynchronous contactless encoding 202 in circle "12", the magnetic encoded data for the magnetic stripes of the target object 107 in the asynchronous magnetic encoding 204 in circle "13", and the printed text and/or patterns of the target object 107 for the printing 234 in circle "16", according to one embodiment.

Figure 5A:
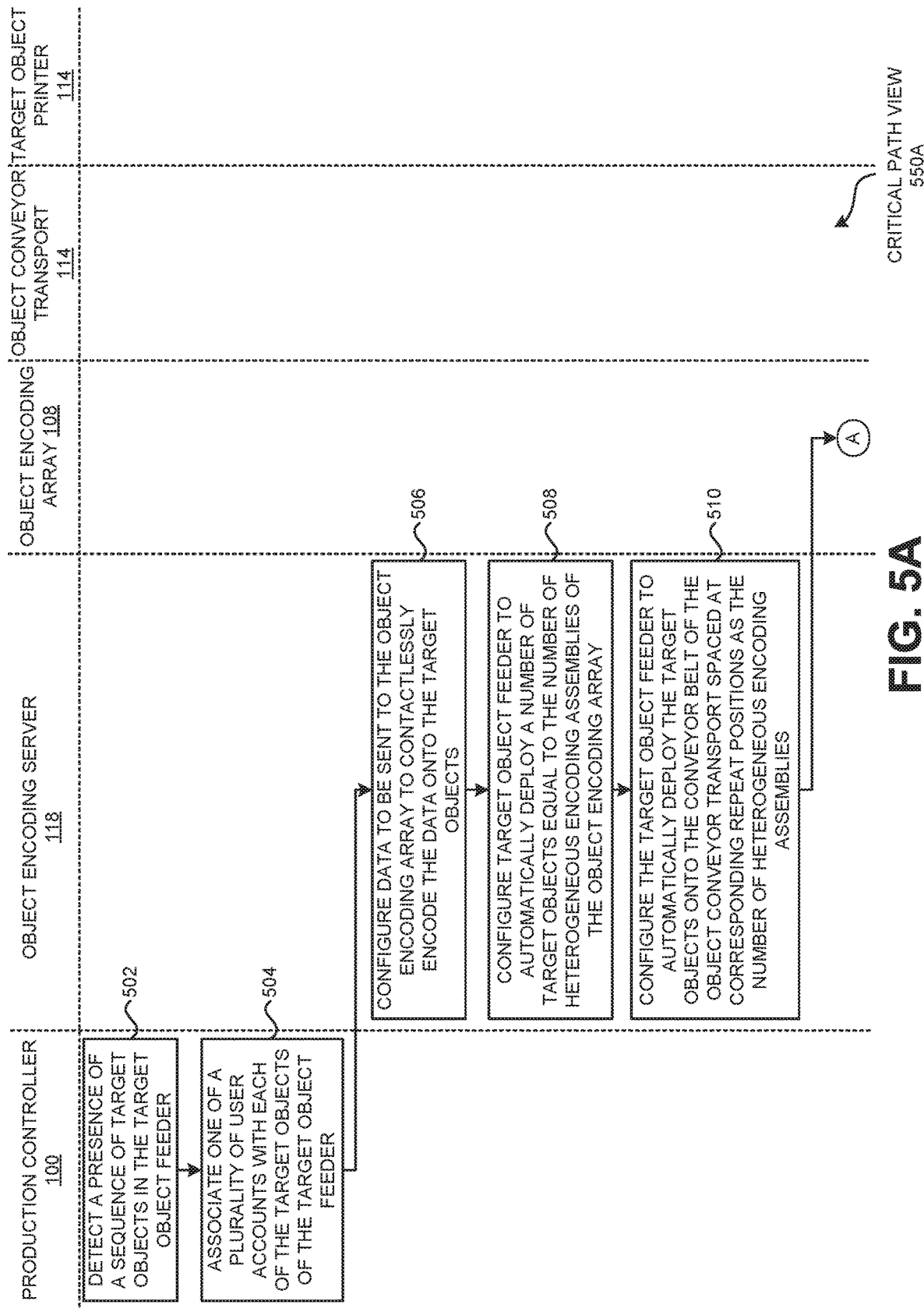
FIG. 5A is a critical path view illustrating a flow based on time to encode and print a plurality of target objects through a contactless encoding using the near-field communication of the triple interface encoding device of FIG. 1, according to one embodiment.
Figure 5B:
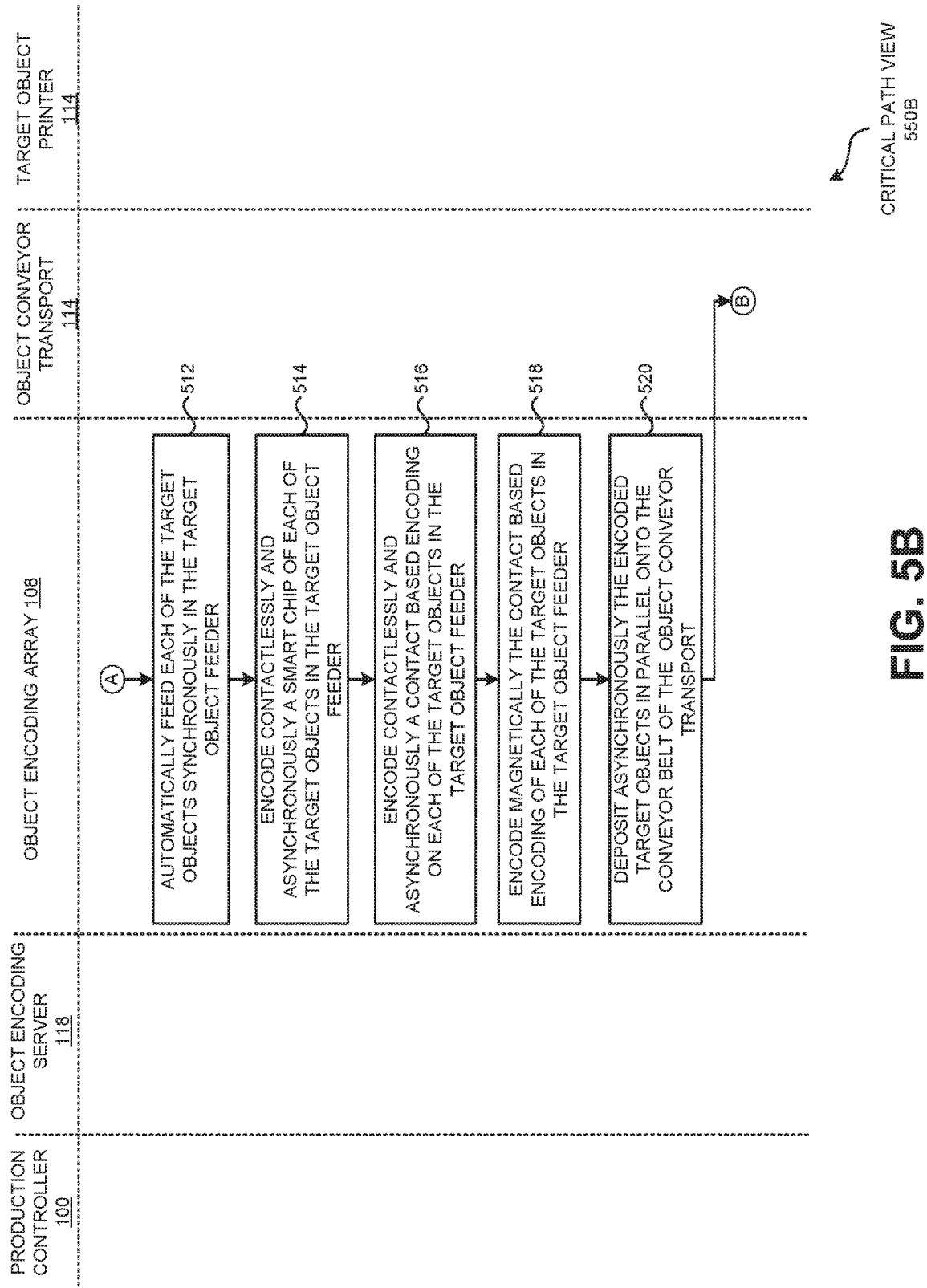
FIG. 5B is a continuation of critical path view of FIG. 4A, according to one embodiment.

FIGS. 5A, 5B and 5C is a critical path view 550A, 550B, and 550C illustrating a flow based on time to encode and print of a plurality of target objects 107A-N through a contactless encoding 135 using the near-field communication of the triple interface encoding device of FIG. 1, according to one embodiment. In operation 502, a production controller 100 may detect a presence of target objects 107A-N in a target object feeder 106. In operation 504, the production controller 100 may associate one of a plurality of user accounts 115 with each of the target objects 107A-N of the target object feeder 106, according to one embodiment.

In operation 506, an object encoding server 118 may configure data to be sent to the object encoding array 108 to encode the data onto the target objects 107A-N. In operation 508, the object encoding server 118 may configure target object feeder 106 to automatically deploy a number of target objects 107A-N equal to the number of heterogeneous encoding assemblies 110A-N of the object encoding array 108. In operation 510, the object encoding server 118 may configure the target object feeder 106 to automatically deploy the target objects 107A-N onto the conveyor belt 112 of the object conveyor transport 114 spaced at corresponding repeat positions 308 as the number of heterogeneous encoding assemblies 110A-N, according to one embodiment.

In operation 512, the object encoding array 108 may automatically feed each of the target objects 107A-N synchronously in the target object feeder. In operation 514, the object encoding array 108 may encode contactlessly and asynchronously a smart chip of each of the target objects 107A-N in the target object feeder 106, according to one embodiment.

In operation 516, the object encoding array 108 may encode contactlessly and asynchronously a contact based encoding on each of the target objects 107A-N in the target object feeder 106. In step 518, the object encoding array 108 may further encode magnetically the contact based encoding of each of the target objects 107A-N in the target object feeder 106. In operation 520, the object encoding array 108 may deposit asynchronously the encoded target objects 134 in parallel onto the conveyor belt 112 of the object conveyor transport, according to one embodiment.

In operation 522, an object conveyor transport may collect the encoded target objects 134 deposited asynchronously in a parallel manner from the 'n' number of heterogeneous encoding assemblies using the conveyor belt 112. In operation 524, the object conveyor transport may move the encoded target objects 134 asynchronously in a serial manner using the conveyor belt 112 to a target object printer, according to one embodiment.

In operation 526, a target object printer may receive the encoded target objects 134 from the object conveyor transport synchronously in a serial manner. In operation 528, the target object printer may synchronize a particular encoded target object with a particular user account. In operation 530, the target object printer may print on a surface of the particular encoded target object based on the particular user account, according to one embodiment.

Figure 6B:
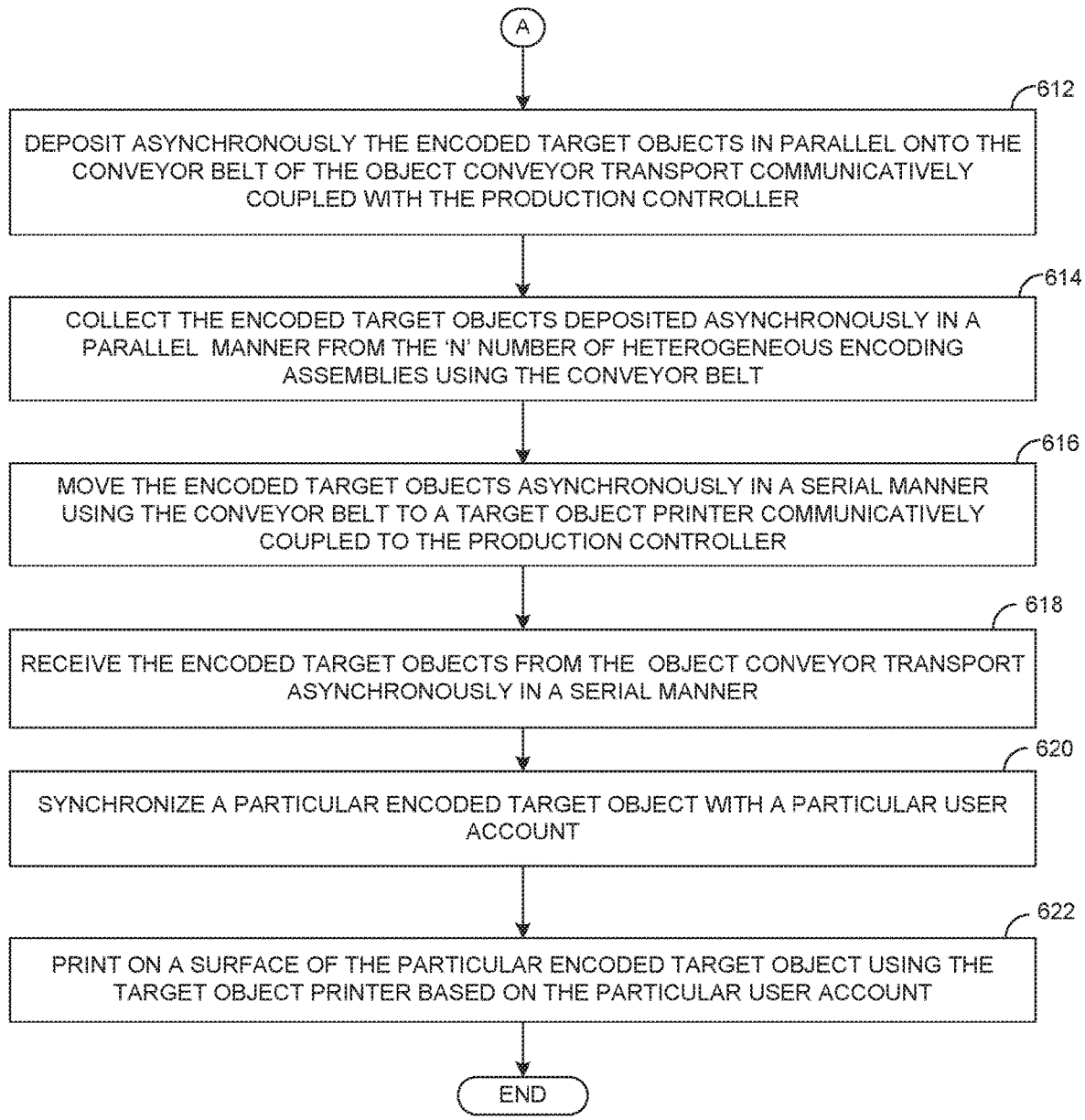
FIG. 6B is a continuation of the process flow of FIG. 6A, according to one embodiment.

FIGS. 6A-6B is a process flow 650A-650B detailing the operations involved in encoding and printing of a number of target objects 107A-N through a contactless encoding 135 using a near-field communication of a triple interface encoding device of FIG. 1, according to one embodiments. In operation 602, a presence of a sequence of target objects 107A-N may be detected to dually encode through a contactless encoding 135 in a target object feeder 106 of an object encoding array 108 comprising 'n' number of heterogeneous encoding assemblies 110A-N communicatively coupled to a production controller 100 arranged along a conveyor belt 112 of an object conveyor transport 114, according to one embodiment.

In operation 604, one of a plurality of user accounts 115 may be associated with each of the target objects 107A-N of the target object feeder 106 communicatively coupled to the production controller 100 based on an identification database 116 of an object encoding server 118 and a custom labeling on a face of each target object 107A-N. In operation 606, each of the target objects 107A-N may be fed automatically and synchronously in the target object feeder 106 into one of the heterogeneous encoding assemblies 110A-N at a base of the target object feeder 106. The target objects 107A-N may be differentiated through the custom labeling on the target objects 107A-N, according to one embodiment.

In operation 608, a smart chip of each of the target objects 107A-N may be encoded asynchronously and contactlessly in the target object feeder 106 associated with each of the plurality of user accounts 115 through one of the heterogeneous encoding assemblies 110A-N at the base of the target object feeder 106. In operation 610, a contact based encoding on each of the target objects 107A-N may be encoded asynchronously and magnetically in the target object feeder 106 associated with each of the plurality of user accounts 115 through one of the heterogeneous encoding assemblies 110A-N at the base of the target object feeder 106, according to one embodiment.

In operation 612, the encoded target objects 134 may be deposited asynchronously in parallel onto the conveyor belt 112 of the object conveyor transport 114 (e.g., servo-controlled vacuum transport) communicatively coupled with the production controller. In operation 614, the asynchronously deposited encoded target objects 134 may be collected in a parallel manner from the 'n' number of heterogeneous encoding assemblies 110A-N using the conveyor belt 112. In operation 616, the encoded target objects 134 may be moved asynchronously in a serial manner using the conveyor belt 112 to a target object printer 142 communicatively coupled to the production controller, according to one embodiment.

In operation 618, the encoded target objects 134 may be received from the object conveyor transport 114 asynchronously in a serial manner. In operation 620, a particular encoded target object may be synchronized with a particular user account. In operation 622, a surface of the particular encoded target object may be printed using the target object printer 142 based on the particular user account, according to one embodiment.

An example embodiment will now be described. The ACME Smart Solution Company may be providing customized ID solutions to its customers for their wide variety of needs and budgets in North Dakota. The ACME Smart Solution Company may be printing and/or customizing the smart cards (e.g., ID badges, payment cards, transit passes, access badges, loyalty cards, student ID cards, national ID cards) and/or wearables (e.g., a smart watch, a fitness band, a medallion, a teatag, a wristband etc.) for its customers.

The ACME Smart Solution Company may be printing personalized ID products and/or cards using graphics, magnetic stripes and/or electronics printing (e.g., contact and contactless RFID smart cards) for providing secured ID solutions to its customers. For printing the smart cards and/or wearables for its customers, the ACME Smart Solution Company may be using a contact-based encoder to magnetically and electrically encode the smart cards followed by printing via an inkjet printer on the surfaces of the smart card. The contact-based encoders used by the ACME Smart Solution Company may be slow because of limited contact-based writing speed (e.g., 9600 baud rate) of its encoders. In addition, the use of contact-based encoder assembly may have led to under-utilization of its high-speed inkjet printer, making the system inefficient and expensive. Further, the contact-based encoder may have moving mechanical components that may produce residue, thermal stress, and misalignment of its component parts when operating, making them unreliable and expensive.

To eliminate the inefficient and expensive processing of its smart cards and/or wearables for its customers, the ACME Smart Solution Company may have implemented the new contactless encoding and printing method as described in various embodiments of FIGS. 1-6B. The ACME Smart Solution Company may have used the new contactless encoding (e.g., using NFC-enabled encoders of object encoding server 118) for printing its triple interface smart cards and/or wearables for its customers as described in various embodiments of FIGS. 1-6B. The ACME Smart Solution Company may now be able to process several cards in parallel using the contactless RFID encoders 306A-N at a rate of 212-848 KBd as described in various embodiments of FIGS. 1-6B, thereby reducing the processing time of its triple interface cards and/or wearables (e.g., target objects 107A-N).

The ACME Smart Solution Company may implement multiple antennas (e.g., object encoding array 108, contactless encoders 105A-N, heterogeneous encoding assembly 110A-N) to run in parallel to take advantage of the throughput allowed by the inkjet printer (e.g., target object printer 142). The object encoding server 118 of the current invention implemented by the ACME Smart Solution Company may be able to configure its servo-controlled friction feeder (e.g., target object feeder 106) to feed its target objects 107A-N (e.g., using indexing algorithm 312) onto the servo-controlled vacuum transport (e.g., object conveyor transport 114) with a repeat that matches the antenna positions (e.g., using corresponding repeat position 308). The object encoding server 118 of the ACME Smart Solution Company may now configure the conveyor belt 112 to stop underneath the antennas (e.g., RFID encoder 306A-N) and write via contactless encoding 135 to the group of target objects 107A-N (e.g., triple interface cards, wearables) as described in various embodiments of FIGS. 1-6B. The use of contactless encoding 135 of its RFID encoders 306A-N may have eliminated the moving mechanical components in its encoders, thereby preventing residue formation, thermal stress, and/or misalignment of its component, making them reliable and efficient.

In addition, the ACME Smart Solution Company may now have ability to use the multi-lane reciprocating feeder (e.g., target object feeder 106) to process non-traditional products, such as wearables (e.g., a smart watch, a fitness band, a medallion, a teatag, a wristband etc.) without necessitating any particular changes in the system, making its system adaptable, according to various embodiments of FIGS. 1-6B. The ACME Smart Solution Company may be able to efficiently print and encode large bulk volumes of various objects for its customers at a low cost, making them happier.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a non-transitory machine-readable medium). For example, the various electrical structure and methods may be embodied using transistors, logic gates, and electrical circuits (e.g., application specific integrated (ASIC) circuitry and/or Digital Signal Processor (DSP) circuitry).

In addition, it will be appreciated that the various operations, processes and methods disclosed herein may be embodied in a non-transitory machine-readable medium and/or a machine-accessible medium compatible with a data processing system (e.g., object encoding server 116). Accordingly, the specification and drawings are to be regarded in an illustrative rather than a restrictive sense.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system), and/or may be performed in any order.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

What is claimed is:

1. A triple interface encoding device comprising:
an object encoding array comprising 'n' number of contactless encoders arranged along a conveyor belt of an object conveyor transport; and
a production controller with a processor and a memory communicatively coupled with the processor to:
detect a presence of a sequence of target objects to be contactlessly tri-encoded in a target object feeder of the object encoding array, and
associate one of a plurality of user accounts with each of the target objects of the target object feeder based on an identification database of an object encoding server communicatively coupled to the production controller to:
configure data to be sent to the object encoding array to contactlessly encode the data onto a smart chip of the each target object associated with each of the plurality of user accounts through one of the contactless encoder, the object encoding array performing the contactless encoding at a speed of 212-848 kilobauds (kBd),
configure the target object feeder to automatically deploy a number of target objects equal to the number of contactless encoders of the object encoding array onto the conveyor belt of the object conveyor transport spaced at corresponding repeat positions as the number of contactless encoders, and configure the conveyor belt of the object conveyor transport to position the each target object underneath the corresponding contactless encoder to encode the configured data onto the each target object, wherein the object encoding array further comprises 'n' number of heterogeneous encoding assemblies communicatively coupled to the production controller to:

automatically authenticate and position the each contactlessly encoded target object synchronously underneath one of the heterogeneous encoding assemblies at a base of the target object feeder, wherein the target objects are differentiated through a custom labeling on the target objects, encode asynchronously a contact based encoding on the each contactlessly encoded target object in the target object feeder associated with the each of the plurality of user accounts through the one of the heterogeneous encoding assemblies at the base of the target object feeder, encode magnetically the contact based encoding on the each contactlessly encoded target object in the target object feeder associated with the each of the plurality of user accounts through the one of the heterogeneous encoding assemblies at the base of the target object feeder, identify a first non-conforming target object, reject the first non-conforming target object, and deposit asynchronously the encoded target objects in parallel onto the conveyor belt of the object conveyor transport, wherein the object conveyor transport is communicatively coupled with the production controller to:

collect the encoded target objects deposited asynchronously in a parallel manner from the 'n' number of heterogeneous encoding assemblies using the conveyor belt, move the encoded target objects asynchronously in a serial manner using the conveyor belt to a target object printer, identify a second non-conforming target object, and reject the second non-conforming target object, and wherein the target object printer is communicatively coupled to the production controller to:

receive the encoded target objects from the object conveyor transport synchronously in the serial manner, synchronize a particular encoded target object with a particular user account, print on a front of the particular encoded target object based on the particular user account, identify a third non-conforming target object, and reject the third non-conforming target object.

2. The triple interface encoding device of claim 1, wherein the contactless encoding performed through the object encoding array is at least one of a radio-frequency identification (RFID) enabled encoding and a Near-Field Communications (NFC) enabled encoding.

3. The triple interface encoding device of claim 2, wherein, in accordance with the RFID enabled encoding, an identifier is first read to make synchronization, followed by a magnetic stripe being encoded, and a security code being printed with a laser on a back of the each target object.

4. The triple interface encoding device of claim 1, wherein the contact based encoding is a magnetic stripe based encoding.

5. The triple interface encoding device of claim 1, wherein a UV DOD print process is used to print variable data needed on the each target object.

6. The triple interface encoding device of claim 1, wherein the target object feeder is configured to hold the each target object under the corresponding contactless encoder until the contactless encoding thereof.

7. The triple interface encoding device of claim 1, wherein:

the contactless encoding is at read and write rates of approximately between 212-848 kBd, and the object encoding server configures the 'n' number of heterogeneous encoding assemblies to write an object identifying portion of the encoding via the contact based encoding and an object authentication portion of the encoding via an RFID encoder to optimize the speed of encoding process.

8. The triple interface encoding device of claim 1, wherein an overall writing time for the each target object is reduced by approximately one-half through automatic feeding of the each target object synchronously in the target object feeder and asynchronous encoding of the smart chip of the each target object.

9. The triple interface encoding device of claim 1, wherein the each target object is one of a credit card, a loyalty card, a wrist wrap, a give-away, and an entry permit, wherein the smart chip of the each target object is encoded based on at least one of an RFID encoding, the contact based encoding, and a magnetic stripe encoding, and wherein the smart chip of the each target object is partially encoded via at least one of the contact based encoding using the 'n' number of heterogeneous encoding assemblies and the contactless encoding based on the RFID encoding to optimize an overall speed of encoding.

10. The triple interface encoding device of claim 1, wherein the production controller is further configured:

to follow accurately the target objects by means of photocells and shaft encoders along a production line, and to analyze and send data to and from sub-systems including any one of feeders, antennas, magnetic encoding, inkjets, cameras, and a machine.

11. The triple interface encoding device of claim 1, wherein the 'n' number of contactless encoders and heterogeneous encoding assemblies are utilized to process several target objects in parallel to increase a writing speed to throughput potential of the contact based encoding, and wherein the triple interface encoding device is configured to transfer the encoded target objects to a single inkjet printer.

12. The triple interface encoding device of claim 1:

wherein the 'n' number of heterogeneous encoding assemblies matches an RFID encoder at a repeat distance of the each target object, wherein the target object feeder is fed a number of target objects equal to the number of contactless encoders which are spaced at same repeat positions as the 'n' number of contactless encoders, wherein a number of contactlessly encoded target objects equal to the number of heterogeneous encoding assemblies are positioned at the base of each heterogeneous encoding assembly spaced at the same repeat positions as the 'n' number of heterogeneous encoding assemblies, wherein the triple interface encoding device indexes the conveyor belt so that the each target object stops underneath the corresponding heterogeneous encoding assembly before the encoding thereof, wherein triple interface encoding device writes to the smart chip via a particular heterogeneous encoding assembly, and wherein when the object encoding server receives a confirmation back that all of the writing is finished, the triple interface encoding device indexes into the next group.

13. The triple interface encoding device of claim 1:

wherein the triple interface encoding device is oriented into a triple terminal configuration to test the each target object after the encoding thereof to ensure functionality of each encoding through a fast check process in which a partial write is done to check a unique identifier.

14. A method of a triple interface encoding apparatus, comprising:

detecting, through a production controller of the triple interface encoding apparatus, a presence of a sequence of target objects;

associating, through the production controller, one of a plurality of user accounts with each of the target objects of a target object feeder communicatively coupled to the production controller based on an identification database of an object encoding server and a custom labeling on a face of the each target object;

configuring, through the object encoding server, data to be sent to an object encoding array comprising 'n' number of heterogeneous encoding assemblies communicatively coupled to the production controller arranged along a conveyor belt of an object conveyor transport;

contactlessly encoding, through the object encoding array, the data onto the each target object associated with each of the plurality of user accounts through one of the heterogeneous encoding assemblies at a speed of 212-848 kBd in accordance with:

the object encoding server configuring the target object feeder to automatically deploy a number of target objects equal to the number of heterogeneous encoding assemblies of the object encoding array onto the conveyor belt of the object conveyor transport spaced at corresponding repeat positions as the number of heterogeneous encoding assemblies, and the object encoding server configuring the conveyor belt of the object conveyor transport to position the target objects underneath the number of heterogeneous encoding assemblies to encode the configured data onto the each target object;

automatically feeding the each target object synchronously in the target object feeder into the one of the heterogeneous encoding assemblies at a base of the target object feeder, wherein the target objects are differentiated through the custom labeling on the target objects;

encoding asynchronously and contactlessly a smart chip of the each target object in the target object feeder associated with the each of the plurality of user accounts through the one of the heterogeneous encoding assemblies at the base of the target object feeder;

encoding asynchronously and magnetically a contact based encoding on the each target object in the target object feeder associated with the each of the plurality of user accounts through the one of the heterogeneous encoding assemblies at the base of the target object feeder;

depositing asynchronously the encoded target objects in parallel onto the conveyor belt of the object conveyor transport communicatively coupled with the production controller;

collecting the encoded target objects deposited asynchronously in a parallel manner from the 'n' number of heterogeneous encoding assemblies using the conveyor belt;

moving the encoded target objects asynchronously in a serial manner using the conveyor belt to a target object printer communicatively coupled to the production controller;

receiving the encoded target objects from the object conveyor transport asynchronously in the serial manner;

synchronizing a particular encoded target object with a particular user account; and printing on a surface of the particular encoded target object based on the particular user account.

15. The method of triple interface encoding apparatus of claim 14, further comprising:

encoding the each target object contactlessly using at least one of an RFID enabled encoding and an NFC enabled encoding, wherein the object encoding server positions a dual terminal to verify a unique individual identifier of the smart chip via contact to ensure functionality and accuracy thereof, and enables advancing of confirmed target objects to an RFID encoder to encode contactlessly;

encoding the each target object using the heterogeneous encoding assemblies with a contact based magnetic stripe encoding; and printing a variable data needed on the each target object using a UV DOD print process.

16. The method of the triple interface encoding apparatus of claim 14, further comprising:

holding the each target object under the corresponding heterogeneous encoding assembly until the contactless encoding thereof in accordance with reading an identifier to make synchronization, encoding a magnetic stripe, and printing a security code with a laser on a back of the each target object.

17. The method of the triple interface encoding apparatus of claim 14, further comprising:

matching an RFID encoder at a repeat distance of the each target object;

feeding a number of target objects equal to the number of heterogeneous encoding assemblies which are spaced at same repeat positions as the 'n' number of heterogeneous encoding assemblies, wherein the each target object is one of a credit card, a loyalty card, a wrist wrap, a give-away, and an entry permit;

indexing a belt so that the each target object stops underneath the corresponding heterogeneous encoding assembly before the encoding thereof;

writing to the smart chip via a particular heterogeneous encoding assembly, wherein the smart chip includes at least one of a contactless RFID encoding, a contact based encoding, and a magnetic stripe encoding; and receiving a confirmation back that all of the writing is finished, followed by indexing a next group in the triple interface encoding apparatus.

18. A triple interface encoding system, comprising:
an object encoding array comprising 'n' number of heterogeneous contactless encoding assemblies arranged along a conveyor belt of an object conveyor transport; and
a production controller with a processor and a memory communicatively coupled with the processor to:
   detect a presence of a sequence of target objects to be contactlessly tri-encoded in a target object feeder of the object encoding array, and
   associate one of a plurality of user accounts with each of the target objects of the target object feeder based on an identification database of an object encoding server communicatively coupled with the production controller to:
      configure data in the identification database of the object encoding server be sent to the object encoding array to encode the data onto the each target object associated with each of the plurality of user accounts through one of the heterogeneous contactless encoding assemblies, the object encoding array performing the contactless encoding at a speed of 212-848 kilobauds (kBd), and
      configure the target object feeder to automatically deploy a number of target objects equal to the number of heterogeneous contactless encoding assemblies of the object encoding array onto the conveyor belt of the object conveyor transport spaced at corresponding repeat positions as the number of heterogeneous contactless encoding assemblies;
   automatically feed the each target object synchronously in the target object feeder into the one of the heterogeneous contactless encoding assemblies at a base of the target object feeder, wherein the target objects are differentiated through a custom labeling on the target objects;
   encode asynchronously and contactlessly a smart chip of the each target object in the target object feeder associated with the each of the plurality of user accounts through the one of the heterogeneous contactless encoding assemblies at the base of the target object feeder;
   encode asynchronously and magnetically a contact based encoding on the each target object in the target object feeder associated with the each of the plurality of user accounts through the one of the heterogeneous contactless encoding assemblies at the base of the target object feeder;
   deposit asynchronously the encoded target objects in parallel onto the conveyor belt of the object conveyor transport communicatively coupled with the production controller;
   collect the encoded target objects deposited asynchronously in a parallel manner from the 'n' number of heterogeneous contactless encoding assemblies using the conveyor belt;
   move the encoded target objects asynchronously in a serial manner using the conveyor belt to a target object printer communicatively coupled to the production controller;
   receive the encoded target objects from the object conveyor transport asynchronously in the serial manner;
   synchronize a particular encoded target object with a particular user account; and
   print on a surface of the particular encoded target object based on the particular user account.

19. The triple interface encoding system of claim 18, wherein the production controller is further configured:
   to follow accurately the target objects by means of photocells and shaft encoders along a production line;
   to utilize the 'n' number of heterogeneous contactless encoding assemblies to process several target objects in parallel to increase a writing speed to a maximum throughput potential of the contact based encoding, wherein the conveyor belt is configured to transfer the encoded target objects to a single inkjet printer;
   to encode the smart chip to include at least one of an RFID encoding, a contact-based encoding, and a magnetic stripe encoding;
   to configure the object encoding server to position a dual terminal to verify a unique individual identifier of the smart chip via contact to ensure functionality and accuracy thereof, and enable advancing confirmed target objects to an RFID encoder for the contactless encoding;
   to configure the number of heterogeneous contactless encoding assemblies of the object encoding array to partially encode through at least one of the contact based encoding and the RFID encoder to optimize an overall speed of encoding; and
   to analyze and send data to and from sub-systems including any one of feeders, antennas, magnetic encoding, inkjets, cameras, and a machine.

20. The triple interface encoding system of claim 18, wherein the production controller is further configured:
   to use a UV DOD print process to print variable data needed on the each target object;
   to first read an identifier to make synchronization, encode a magnetic stripe, and print a security code with a laser on the each target object; and
   to reduce an overall writing time for the each target object to approximately one-half through automatic feeding of the each target object synchronously in the target object feeder and asynchronous encoding of the smart chip of the each target object.

* * * * *